(12) United States Patent
O'Neill et al.

(10) Patent No.: US 11,989,839 B2
(45) Date of Patent: May 21, 2024

(54) METHOD FOR AUTOMATIC CREATION OF REAL-TIME RENDERING CONTENT

(71) Applicant: The Boeing Company, Chicago, IL (US)

(72) Inventors: Patrick William O'Neill, Seattle, WA (US); Mark Gordon Sellars, Lake Stevens, WA (US); Michael Joseph Surface, Sedro-Wooley, WA (US); Nick S. Evans, Lynnwood, WA (US); James J. Salmon, Kirkland, WA (US)

(73) Assignee: The Boeing Company, Arlington, VA (US)

( * ) Notice: Subject to any disclaimer, the term of this patent is extended or adjusted under 35 U.S.C. 154(b) by 202 days.

(21) Appl. No.: 17/539,766

(22) Filed: Dec. 1, 2021

(65) Prior Publication Data

US 2022/0222901 A1   Jul. 14, 2022

Related U.S. Application Data

(60) Provisional application No. 63/136,751, filed on Jan. 13, 2021.

(51) Int. Cl.
| | |
|---|---|
| *G06T 19/00* | (2011.01) |
| *G06F 3/12* | (2006.01) |
| *G06F 9/48* | (2006.01) |
| *G06F 9/50* | (2006.01) |
| *G06T 19/20* | (2011.01) |

(52) U.S. Cl.
CPC .......... *G06T 19/006* (2013.01); *G06F 3/1285* (2013.01); *G06F 9/4881* (2013.01); *G06F 9/5055* (2013.01); *G06F 9/5072* (2013.01); *G06T 19/00* (2013.01); *G06T 19/20* (2013.01)

(58) Field of Classification Search
None
See application file for complete search history.

(56) References Cited

U.S. PATENT DOCUMENTS

| 11,231,967 | B2* | 1/2022 | Muraleedharan ..... G06F 9/5072 |
| 2020/0379909 | A1* | 12/2020 | Uhrenholt ........... G06F 12/0831 |
| 2022/0028514 | A1* | 1/2022 | Myers .................... G16H 20/10 |

* cited by examiner

*Primary Examiner* — Michael J Cobb
(74) *Attorney, Agent, or Firm* — Alleman Hall & Tuttle LLP

(57) ABSTRACT

A method including executing a logical computing element (LCE) on a server. Worker LCEs are executed on the server. A first electronic file comprising geometry data in a first data structure is received at the controller LCE. An available worker LCE is identified, by the controller LCE, as an in-use worker LCE from among the worker LCEs. The geometry data is imported by the in-use worker LCE. A job instance is established by the in-use worker LCE. A rendering engine is launched by the in-use worker LCE. The rendering engine generates, for the job instance and using the geometry data, a dataset file in a second data structure different than the first data structure. The dataset file is returned by the in-use worker LCE to the controller LCE. The dataset file is returned by the controller LCE to a remote computer.

20 Claims, 15 Drawing Sheets

US 11,989,839 B2

METHOD FOR AUTOMATIC CREATION OF REAL-TIME RENDERING CONTENT

RELATED APPLICATIONS

This application claims priority to U.S. Provisional Patent Application 63/136,751, filed Jan. 13, 2021, the entirety of which is hereby incorporated by reference.

BACKGROUND

Virtual reality (VR) systems, augmented reality (AR) systems, computer assisted drawing (CAD) systems, image rendering systems, and other such systems may be used to display images or videos. For example, virtual representations of real objects can be rendered in a VR, AR, or CAD environment. Creating such environments can be time consuming and can rely on the skill of the operator.

SUMMARY

The one or more embodiments provide for a method. The method includes executing a logical computing element (LCE) on a server. The method also includes executing a plurality of worker LCEs on the server and receiving, at the controller LCE, a first electronic file including geometry data in a first data structure. The method also includes identifying, by the controller LCE, an available worker LCE as an in-use worker LCE from among the plurality of worker LCEs. The method also includes importing, by the in-use worker LCE, the geometry data and establishing, by the in-use worker LCE, a job instance. The method also includes launching, by the in-use worker LCE, a rendering engine and generating, by the rendering engine for the job instance and using the geometry data, a dataset file in a second data structure different than the first data structure. The method also includes returning, by the in-use worker LCE, the dataset file to the controller LCE; and returning, by the controller LCE, the dataset file to a remote computer.

The one or more embodiments also provide for a system. The system includes a controller LCE service on a server. The controller LCE is configured to receive a first electronic file including geometry data in a first data structure. The controller LCE is also configured to identify an available worker LCE as an in-use worker LCE from among a plurality of worker LCEs. The controller LCE is also configured to return a dataset file to a remote computer in a second data structure different than the first data structure. The system also includes the plurality of worker LCEs services on the server, including the in-use worker LCE. The in-use worker LCE is configured to import the geometry data from a storage. The in-use worker LCE is also configured to create a configuration document. The in-use worker LCE is also configured to launch a rendering engine to generate the dataset file. The in-use worker LCE is also configured to return the dataset file to the storage. The rendering engine is configured to process, for the job instance using the geometry data, the dataset file in the second data structure.

The one or more embodiments also includes a non-transitory computer readable storage medium storing program code which, when executed by a processor, performs a computer-implemented method. The computer-implemented method includes executing a controller LCE on a server. The computer-implemented method also includes executing a plurality of worker LCEs on the server. The computer-implemented method also includes receiving, at the controller LCE, a first electronic file including geometry data in a first data structure. The computer-implemented method also includes identifying, by the controller LCE, an available worker LCE as an in-use worker LCE from among the plurality of worker LCEs. The computer-implemented method also includes. The computer-implemented method also includes importing, by the in-use worker LCE, the geometry data. The computer-implemented method also includes establishing, by the in-use worker LCE, a job instance. The computer-implemented method also includes launching, by the in-use worker LCE, a rendering engine. The computer-implemented method also includes generating, by the rendering engine for the job instance and using the geometry data, a dataset file in a second data structure different than the first data structure. The computer-implemented method also includes returning, by the in-use worker LCE, the dataset file to the controller LCE. The computer-implemented method also includes returning, by the controller LCE, the dataset file to a remote computer.

Other aspects of the invention will be apparent from the following description and the appended claims.

DETAILED DESCRIPTION

Figure 1:
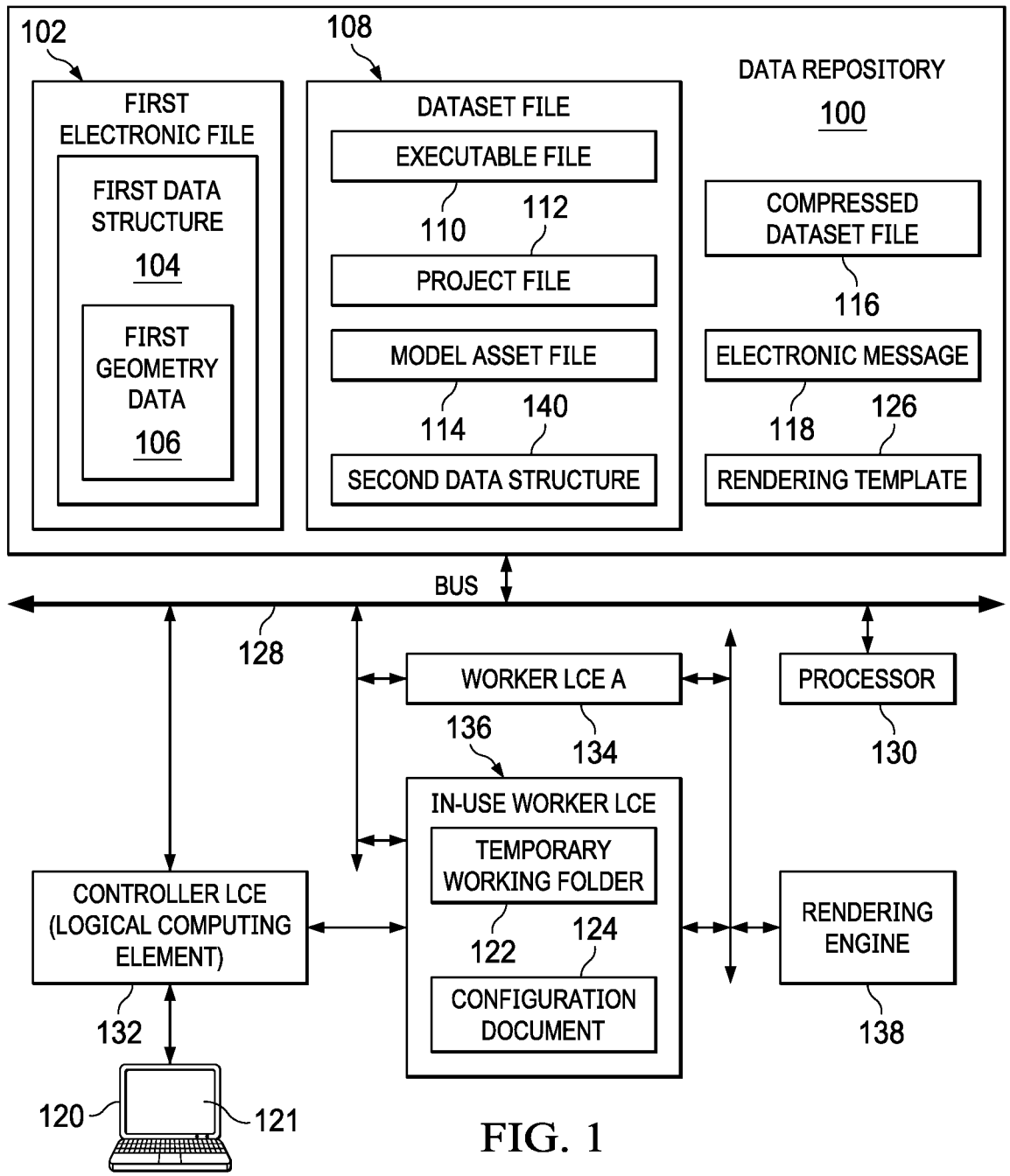
FIG. 1 shows an automatic virtual reality creator, in accordance with one or more embodiments.

Specific embodiments of the invention will now be described in detail with reference to the accompanying figures. Like elements in the various figures are denoted by like reference numerals for consistency.

In the following detailed description, numerous specific details are set forth in order to provide a more thorough understanding of the invention. However, it will be apparent to one of ordinary skill in the art that examples may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

Electronic files including geometry data, which may be referred-to as electronic geometry data (EGD) files, are useful for establishing a rendering session on a local computer. As used herein, EGD files are files which contain the data which are useable by a computer to implement, at least in part, a rendering session.

As used herein, a "rendering session" is a computer-executed instance of three-dimensional modeling (3D modeling). As used herein, an "augmented rendering session" is a rendering session with additional interactivity added, such as one or more of virtual parts that interact with each other, added textual information or instructions, etc. Thus, an augmented rendering session is a type of rendering session.

Examples of a rendering session include virtual reality (VR), augmented reality (AR), computer assisted drawing (CAD), and other types of 3D modeling. Examples of an augmented rendering session include VR, AR, and the like, but exclude basic rendering sessions such as CAD sessions or simple drawing renderings.

In a manufacturing and maintenance context, an augmented rendering session may be used to increase the accuracy and efficiency of manufacturing and/or maintenance. For example, an interactive EGD representation of the parts of a portion of an aircraft can be projected in a user interface as a VR or AR session. The technician can then manipulate and/or view the user interface to see where parts are placed, view instructions for performing manufacturing or maintenance actions, etc. In this manner, both the speed and accuracy of working with the real parts can be improved.

Real aircraft, and real parts for the aircraft, may be rendered specifically as a computer automated design (CAD) file prior to manufacture or maintenance. In this manner, the precise dimensions and interconnectivity of parts may be modeled and changed prior to building or performing maintenance on the real parts. As noted above, by itself, a CAD file cannot be used to establish an augmented rendering session (e.g., a VR or AR session) on a local computer.

In general, examples herein relate to an automatic rendering session creator. More specifically, the one or more embodiments relate to a system for automatically creating, from one or more EGD files (e.g., a CAD file) that may be used to establish an augmented rendering session on a local computer. The one or more embodiments may be used to generate more general forms of renderable files, such as CAD files. The one or more embodiments may also be characterized as an automated mechanism for transforming a first file type with a first data structure (e.g., a CAD file) into a second file type with a second data structure (e.g. one or more of several different types of virtual reality (VR) files); or, alternatively, building a second file type (a EGD file) using a first file type (the CAD file).

The follow summarizes the pipeline for automatically creating real-time rendering content, from the importing models to 3D geometry conversion and optimization, to automatic delivery to the end-user. Technicians may then use the VR, AR, or CAD environment to see how components interact. In this manner, a technician can identify the proper parts and techniques prior to working on the real systems. Thus, rendering systems can increase the efficiency and accuracy of aircraft manufacturing and maintenance.

Prior to the one or more embodiments, transforming the CAD file into one or more EGD files, or building the EGD file(s) from the CAD file(s), required an expert computer programmer. For example, if a technician had a CAD file, but wanted to build a VR session from the CAD file, then an expert computer programmer would be required to generate the EGD files necessary to establish a VR session from the underlying data in the CAD file.

However, only a limited number of such expert programmers may be available. Even with expert programmers, creating such environments can be time consuming, and the quality of the resulting environments can rely on the skill of the operator. If a large number of manufacture and maintenance teams desire to establish augmented rendering sessions from existing CAD files, then the limited number of expert programmers can create a bottleneck for the demand for EGD files for augmented rendering sessions. The one or more embodiments enable the automatic accommodation of common requests for augmented rendering EGD files from geometry files, such as CAD files, saving the expert programmer's time for creating more rarely desired custom EGD files.

The one or more embodiments address this and other issues by solving the technical problem of automatically transforming a geometry file into a different type of EGD file, such as for example, to automatically build an augmented EGD file from a provided CAD file. Such a file transformation or file build is not a straightforward translation, such as in the case of a computer compiler where code is re-written in another form. The details of the transformation or file build of EGD files from a CAD file are described with respect to the figures, below.

Attention is now turned to the figures. FIG. 1 shows an automatic virtual reality creator system, in accordance with one or more embodiments of the invention. The computing system includes a data repository (100). In one or more embodiments of the invention, the data repository (100) is a storage unit and/or device (e.g., a file system, database, collection of tables, or any other storage mechanism) for storing data. Further, the data repository (100) may include multiple different storage units and/or devices. The multiple different storage units and/or devices may or may not be of the same type and may or may not be located at the same physical site. The data repository (100) may also be characterized as a non-transitory computer readable storage medium.

The data repository (100) includes a first electronic file (102). The term "first" has no structural significance by itself, other than to distinguish the first electronic file (102) from other electronic files described herein.

An electronic file, as used herein, is a data structure that contains, or is configured to contain, electronic data stored by and readable by a computer. Examples of data structures include tables, tries, graphs, text files, etc.

The first electronic file (102), in particular, includes a first data structure (104). Again, the term "first" is only used as an identifier. The first data structure (104) stores first geometry data (106). The first geometry data (106) is electronic data which, when read by a computer, is usable to render a virtual representation of a geometric object. Examples of the first geometry data (106) include CAD files, real-time rendering project files, polygonal geometry files, object definition files, etc.

The data repository (100) also stores a dataset file (108). As used herein, the dataset file (108) is defined as a second data structure, different than the first data structure (104), that stores data useable to execute or provision an augmented rendering session. The dataset file (108) is an example of an EGD file, and thus any reference to EGD file herein may also be described as the dataset file (108). The dataset file (108) may take a variety of different forms. For example, the dataset file (108) may be an executable file intended for use with a virtual reality headset or for an augmented reality headset. The dataset file (108) may be a desktop application or interactive computer application controlled by one or more user inputs. The dataset file (108) may be dataset files so that a developer can add more content. The dataset file (108) may be 3D assets, such as FilmBox (FBX) file types, which can be used in other programs such as animation software or other rendering engines. The dataset file (108) may take many other forms, but fall into three main types.

For example, the dataset file (108) may be an executable file (110). The executable file (110) is one or more files, possibly together with all library and geometric information, needed by a computer to generate the augmented rendering session, without more. Thus, for example, a technician who is not knowledgeable about augmented rendering session generation may order the preparation of an entire executable file to establish a augmented rendering session, without having any of the augmented reality software pre-loaded on the technician's computer. The resulting executable file is a self-contained computer application, which can be manually launched by a technician. The executable file contains encoded instructions in order to properly work on the target technology platform previously mentioned: virtual reality headset, augmented reality headset, or desktop application.

The dataset file (108) may also take the form of a project file (112). The project file (112) is one or more files that, when plugged into existing augmented rendering software, may be used to execute an augmented rendering session. Thus, the project file (112) provides the basic files useable to establish an augmented rendering session, but may be assembled or used in a flexible manner by a knowledgeable technician. The project file can be used by an expert programmer to add custom or additional content to the EGD files.

The dataset file (108) may also take the form of a model asset file (114). A model asset file (114) is a files that contain information that is useable by a variety of different polygonal applications, such as UNREAL ENGINE®, UNITY® or AUTODESK 3DS MAX®. Examples of the type of information that are included within a model asset file are vertex positions, embedded textures, axis orientation, and unit scale. Thus, the model asset file (114) provides the raw data useable to establish an augmented rendering session, but the technician must be at least somewhat knowledgeable in rendering applications in order to properly use the model asset file (114). The model asset file (114) provides the maximum flexibility for establishing a custom augmented rendering session.

The dataset file (108) may take other forms, or perhaps a hybrid form of the forms described above. Thus, the one or more embodiments do not necessarily limit the dataset file (108) to be only one of the executable file (110), the project file (112), and the model asset file (114).

The data repository (100) may also store a compressed dataset file (116). The compressed dataset file (116) is the dataset file (108), but compressed to take up less space within the data repository (100). The compressed dataset file (116) may be a ZIP® file, for example, or the result of the application of some other data compression algorithm. The compressed dataset file (116) is useful for reducing the time needed to transmit the compressed dataset file (116) and reducing the space needed to store the compressed dataset file (116).

The data repository (100) may also store an electronic message (118). The electronic message (118) may take the form of an email, a private message, a chat session, some other electronic message. The electronic message (118) also may be the dataset file (108) itself or the electronic message (118) itself, in the case of a direct file transfer protocol (FTP) transfer. The electronic message (118) is a means of communicating the dataset file (108) or the compressed dataset file (116) from a server that produces the dataset file (108) to a remote computer (120). The electronic message (118) may be generated by the controller LCE (132), described further below. Note that the electronic message (118) may take the form of a link that is emailed to a user or displayed in the user's web browser. The user can then click on the link and download the desired dataset file (108).

The remote computer (120) is a computer operated at least logically remotely from the server that executes the method of generating the dataset file (108) or the compressed dataset file (116), such as the methods of FIG. 2A through FIG. 2F. In many cases, the remote computer (120) is physically remote from the server. The remote computer (120) may be operated by a user that desires the automatic generation of the dataset file (108) or the compressed dataset file (116). The remote computer (120) may include a variety of input means for interacting with the system shown in FIG. 1. For example, the remote computer (120) may include a web browser (121) which may be used to transmit geometry data, to prompt the user for information, etc.

The data repository (100) may also store a temporary working folder (122). The temporary working folder (122) is a logical storage location on the server. The temporary working folder (122) is useful for organizing and processing the files which will ultimately become the dataset file (108) or the compressed dataset file (116).

The data repository (100) also stores a configuration document (124). The configuration document (124) stores any portion of job information that relates to rendering in a format that is readable by a rendering engine. The configuration document (124) may also include directions to a controller LCE with respect to the handling of the dataset file (108) or the compressed dataset file (116) after generation.

The data repository (100) may also store a rendering session template (126). The rendering session template (126) is a set of files that contain commonly used instructions and processes in many, or at least some, of the dataset files that will be generated using the one or more embodiments. For example, the rendering session template (126) may include much of the commonly used information that will be used to build the dataset file (108).

The data repository (100) may store other types of information useful for generating the dataset file (108) or the compressed dataset file (116). Thus, the one or more embodiments are not necessarily limited to the examples described above.

The system shown in FIG. 1 may also include a bus (128). The bus (128) is a wired or wireless set of communication links that enable electronic communication between hardware devices or logical computing elements. Thus, for example, the bus (128) allows data to pass to a processor (130) used to perform the calculations performed to implement the one or more embodiments described herein.

The system shown in FIG. 1 also includes a controller LCE (132). The controller LCE (132) is a controller "logical computing element." The controller LCE (132) may be a virtual machine, a real processor, a logically separate computer, or other device useful for performing the functions of the controller LCE (132) described with respect to FIG. 2A through FIG. 2F.

As used herein, a "virtual machine" (VM) is an emulation of a computer system. Generally, VMs are based on computer architectures and provide functionality of a physical computer. The one or more embodiments contemplate use of process VMs. A process VM may be designed to execute one or more computer programs in a platform-independent environment. In a sense, a VM is a "portion" of the computing system resources of a server, logically separated to act like its own computer. Note that while the controller LCE (132) may be a VM, in other embodiments the controller LCE (132) is another computer.

As indicated above, the functions of the controller LCE (132) are described with respect to FIG. 2A through FIG. 2F. However, briefly, the controller LCE (132) is configured to identify an available worker LCEs, described below, generate the compressed dataset file (116), and coordinate communications between the system shown in FIG. 1 and the remote computer (120).

The system shown in FIG. 1 also includes one or more worker LCEs, and typically will have many worker LCEs, such as worker LCE A (134) and in-use worker LCE (136). As used herein, a worker LCE is a logical computing element configured or programmed to coordinate the work of generating the compressed dataset file (116). The worker LCE A (134) is representative of one of possibly many available worker LCEs. The in-use worker LCE (136) is a worker LCE that is currently being used to generate the dataset file (108) from the first electronic file (102) received from the remote computer (120).

For example, the in-use worker LCE (136) may import the geometry data from a storage, create a configuration document, launch a rendering engine to generate the dataset file, and return the dataset file to the data repository (100). The functions of the worker LCEs are described more with respect to FIG. 2A through FIG. 2F.

The system shown in FIG. 1 may also include a rendering engine (138). The rendering engine (138) is software and/or application specific hardware (ASIC) that is used to generate the dataset file (108) itself from the first electronic file (102). The rendering engine (138) may be an off-the-shelf rendering engine, or may be a custom rendering engine. The rendering engine (138) is executable on the server (the processor (130)) to process, for a requested job instance using the first geometry data (106), the dataset file (108) into a second data structure (140). The second data structure (140) is the data structure in which the dataset file (108) is stored, or the format of the dataset file (108).

While FIG. 1 shows a configuration of components, other configurations may be used without departing from the scope of the invention. For example, various components may be combined to create a single component. As another example, the functionality performed by a single component may be performed by two or more components.

FIG. 2A through FIG. 2F show methods for automatically creating a virtual reality file, and variations on the method, in accordance with one or more embodiments of the invention. The methods of FIG. 2A through FIG. 2F may be implemented using the system shown in FIG. 1. The methods shown in FIG. 2A through FIG. 2F may be characterized as a method for automatic creation of real-time rendering content, and variations thereof.

At step 200, a controller logical computing element (LCE) is executed on a server. The controller LCE may perform a variety of different functions, as described further below.

At step 202, multiple worker LCEs are executed on the server. The worker LCEs perform a variety of different functions, as described further below. The controller LCE and the worker LCEs may be executed concurrently or at different times. As used herein, "executing" an LCE may be interpreted as provisioning an LCE. In any case, in one embodiment, the controller LCE may be provisioned and ready in most cases, but the worker LCEs may be provisioned on an "as-needed" basis (e.g., in real time).

At step 204, the controller LCE receives a first electronic file including geometry data in a first data structure, and, if applicable, may receive job configuration information. The first electronic file may be received from a web browser on a remote computer, for example. However, the first electronic file may also have already placed in the data repository, and a command is issued to process the first electronic file. The job configuration information, which is optional in some embodiments, may also be received from the remote computer, or may be pre-stored instructions on the data repository.

At step 206, the controller LCE identifies an available worker LCE as an in-use worker LCE from among the worker LCEs. The identification may be performed by scanning already provisioned worker LCEs and selecting one that is not currently in use. The identification may also be performed by the controller LCE issuing a command to provision a new worker LCE.

At step 208, the in-use worker LCE imports the geometry data. The in-use worker may import the geometry data by retrieving the geometry data from the controller LCE. However, other techniques may be used. For example, the in-use worker LCE may retrieve the geometry data directly from the remote computer. In an embodiment, the controller LCE may push the geometry data to the in-use worker LCE. Thus, the term "import" as used herein contemplates both active retrieval of data by the in-use worker LCE as well as passively receiving the data.

At step 210, the in-use worker LCE establishes a job instance. The in-use worker LCE establishes the job instance be beginning execution of instructions necessary to generate the dataset file. For example, the in-user worker LCE may establish a working folder on the server, retrieve a template, read a configuration file, etc.

At step 212, the in-use worker LCE launches a rendering engine. The in-use worker LCE may launch a rendering engine by executing an application launcher, or by sending a command to a rendering engine to begin processing. An application launcher, generally, is software that is configured to speed up or otherwise assist in the launch of some other piece of software.

At step 214, the rendering engine generates, for the job instance and using the geometry data, a dataset file in a second data structure different than the first data structure. The generation of the dataset file is accomplished by compiling the project-specific source code, converting content into a format that can be used by the target platform, and bundling the dataset into a distributable set of files, such as an executable file (110). Additional details regarding generation of the dataset file is described with respect to FIG. 7. In one embodiment, the method of FIG. 2A may terminate thereafter.

Figure 2A:
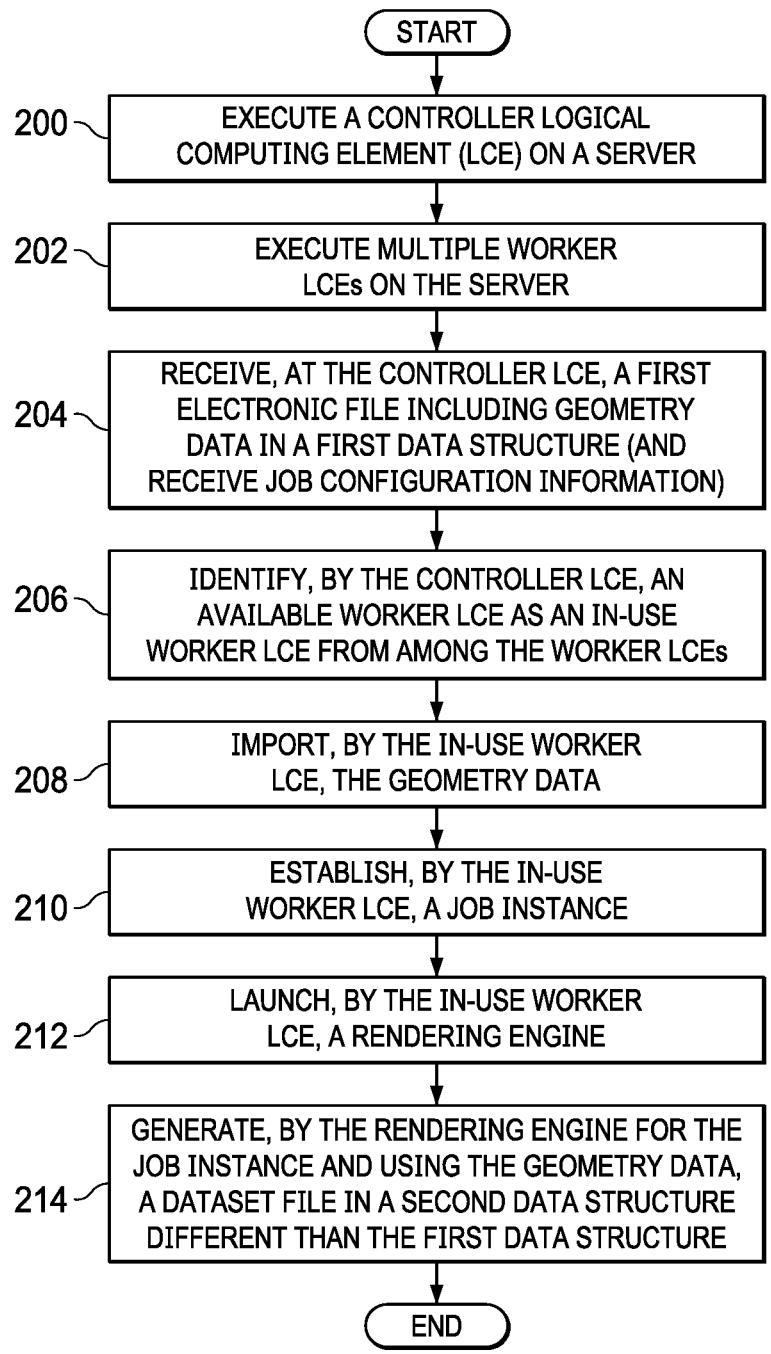
FIG. 2A, FIG. 2B, FIG. 2C, FIG. 2D, FIG. 2E, and FIG. 2F show methods for automatically creating a virtual reality file, and variations on the method, in accordance with one or more embodiments.
Figure 2B:
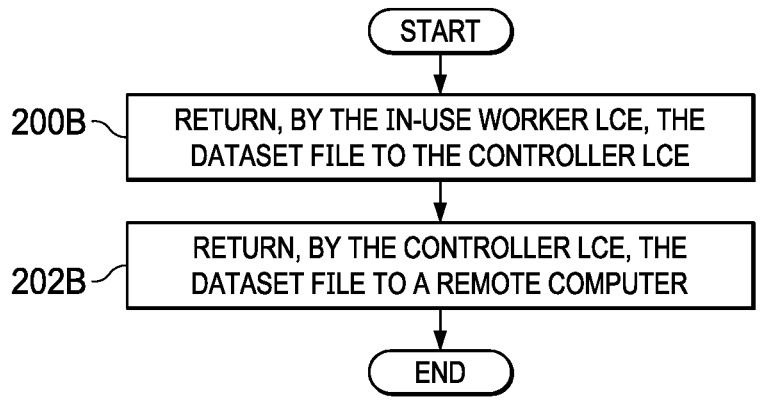

FIG. 2B is an extension of FIG. 2A. At step 200B, the in-use worker LCE returns the dataset file to the controller LCE. The data set file may be returned by pushing to the controller LCE, or being pulled by the controller LCE. At step 202B, the controller LCE returns the dataset file to a remote computer. Again, the dataset file may be returned to the remote computer by push or by pull. In an embodiment, the dataset file may be returned via an email generated by the controller LCE, perhaps via an attachment to the email. In one embodiment, the method of FIG. 2B may terminate thereafter.

Returning the dataset file in either case may include returning a virtual reality (VR) executable file configured to generate an VR environment on the remote computer. Returning the dataset file may also include returning a plurality of dataset files configured for use by a system selected from the group consisting of: virtual reality software and hardware, augmented reality software, and desktop computing software. Returning the dataset file may also include returning model asset files configured for use by a polygon rendering program.

Figure 2C:
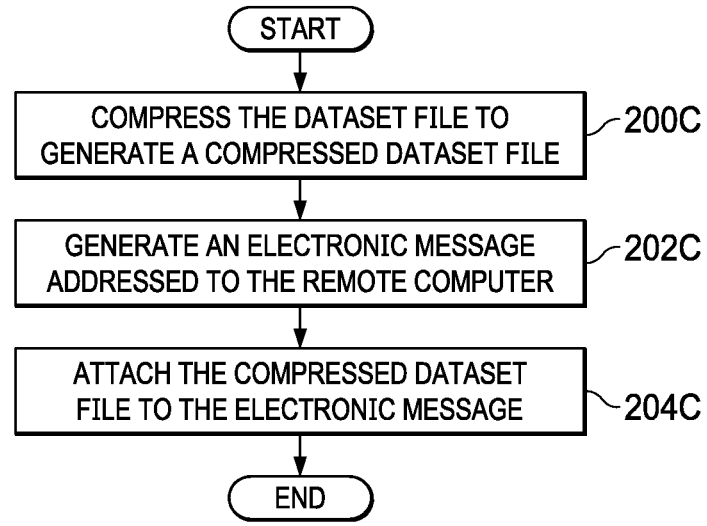

FIG. 2C shows an extension of the method of FIG. 2A. At step 200C the dataset file is compressed to generate a compressed dataset file. Compression may be performed using a compression utility. Then, at step 202C, an electronic message addressed to the remote computer is generated. Generation may be performed using an email program, FTP protocol, chat message program, etc. Then, at step 204C, the compressed dataset file is attached to the electronic message. In one embodiment, the method of FIG. 2C may terminate thereafter.

Figure 2D:
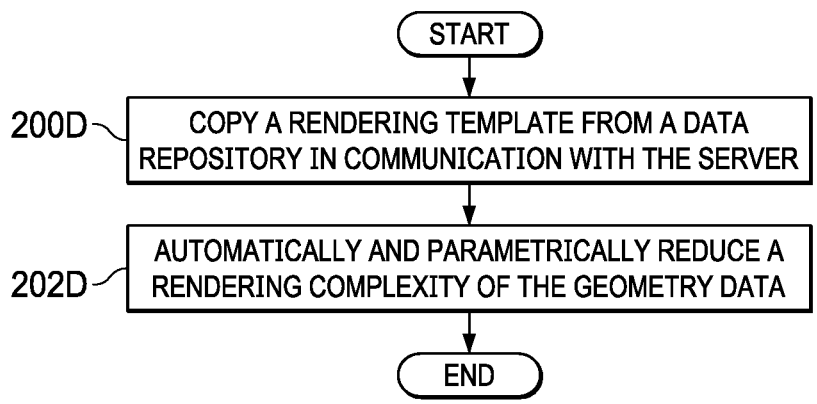

FIG. 2D shows an extension of the method of FIG. 2A, prior to calling the rendering engine at step 214. At step 200D, a rendering template is copied from a data repository in communication with the server. The rendering template may have been pre-generated. Alternatively, the rendering template may be generated, and possibly thereafter saved for later use.

At step 202D, a rendering complexity of the geometry data is automatically and parametrically reduced. The rendering complexity may be reduced by creating levels of detail (LOD). LOD is the process of creating multiple versions of the original geometry, with decreasing levels of geometrical detail. At runtime, the full-detail models are substituted for the models with reduced detail as desired. LOD techniques increase the efficiency of rendering by decreasing the workload on the graphics pipeline. In one embodiment, the method of FIG. 2D may terminate thereafter.

Figure 2E:
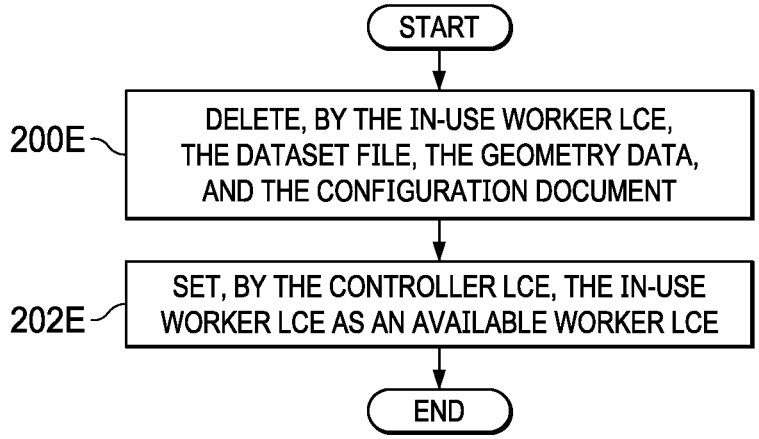

FIG. 2E shows an extension of the method of 2B, particularly after the in-use worker LCE returns the dataset file at step 200B or step 202B. At step 200E, the in-use worker LCE may delete the dataset file, the geometry data, and the configuration document. Then, at step 202E, the controller LCE may set the in-use worker LCE as an available worker LCE. In one embodiment, the method of FIG. 2D may terminate thereafter.

Figure 2F:
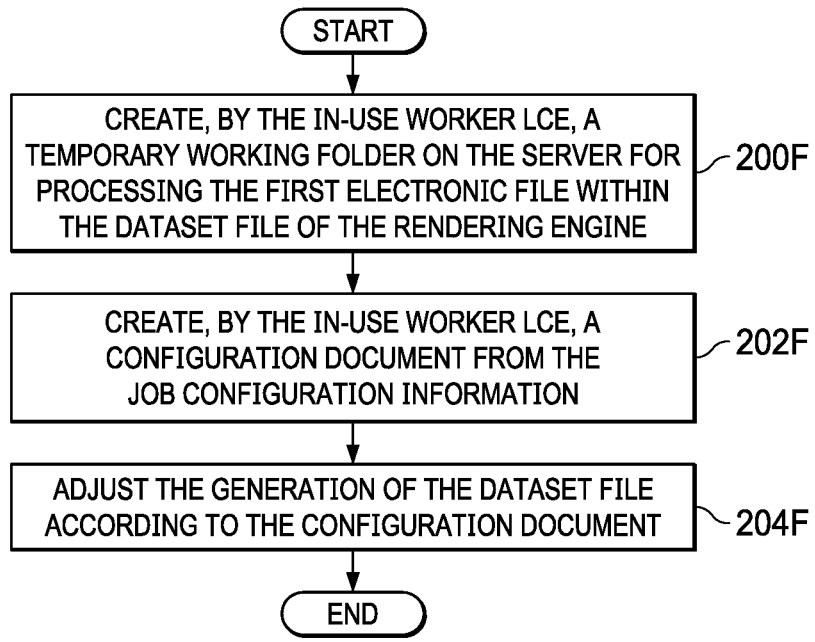

FIG. 2F shows steps that may be performed as part of establishing the job instance at step 210 in FIG. 2A. The method of FIG. 2F assumes that the job configuration information was received at step 204 in FIG. 2A.

At step 200F, the in-use worker LCE creates a temporary working folder on the server for processing the first electronic file within the dataset file of the rendering engine, as described above. Then, at step 202F, the in-use worker LCE creates a configuration document from the job configuration information, as described above. At step 204F, the generation of the dataset file is adjusted according to the configuration document. For example, the configuration document may specify whether the user wishes to receive one of the executable file (110), the project file (112), or the model asset file (114) of the dataset file (108) of FIG. 1. The dataset file is generated accordingly. In one embodiment, the method of FIG. 2F may terminate thereafter.

While the various steps in the flowcharts are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments of the invention. By way of an example, determination steps may not require a processor to process an instruction unless an interrupt is received to signify that condition exists in accordance with one or more embodiments of the invention. As another example, determination steps may be performed by performing a test, such as checking a data value to test whether the value is consistent with the tested condition in accordance with one or more embodiments of the invention.

FIG. 3 through FIG. 11B present a specific example of the techniques described above with respect to FIG. 1 and FIG. 2A through FIG. 2F. The following example is for explanatory purposes only and not intended to limit the scope of the invention.

Figure 3:
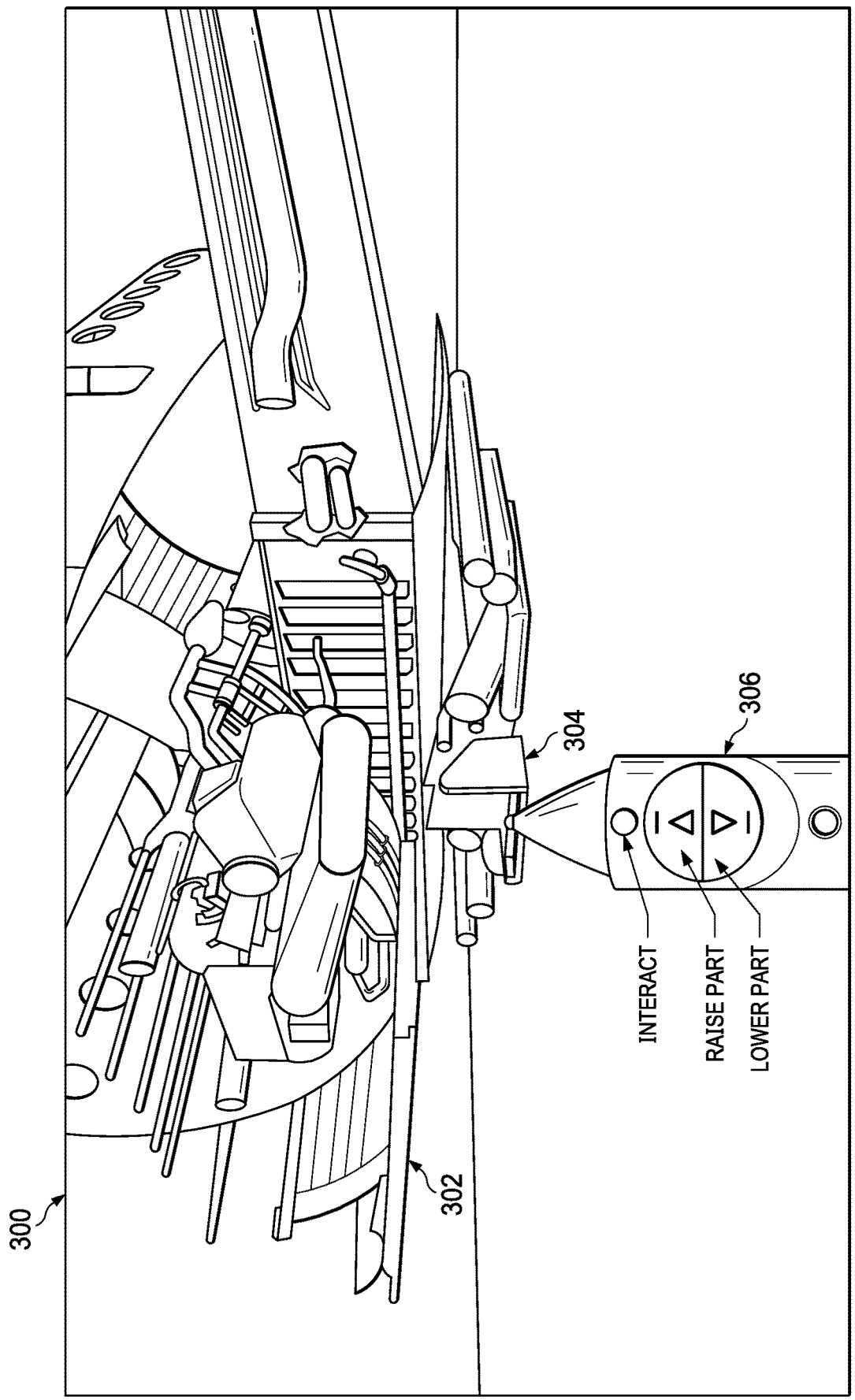
FIG. 3 shows an example of a virtual reality rendering, in accordance with one or more embodiments.

FIG. 3 shows an example of virtual reality rendering, in accordance with one or more embodiments of the invention. Rendering (300) shows a virtual reality (VR) representation of various parts of an aircraft (302) under construction, including part (304). The rendering (300) is displayed to a user via a display device, which may be VR goggles, a heads up display (HUD) helmet, a monitor, etc.

The VR parts, including part (304), may be manipulated using a user interface (306). The user may manipulate the user interface (306) via the use of VR gloves, a mouse, a joystick, eye manipulation, or other physical input devices. With the user interface (306), the user may move the part (304) relative to other parts, see how the part (304) can or should connect to other parts, replace the part (304) with substitute parts to see if the substitute parts will fit, rotate the part (304), or take other actions. Optionally, instructions for installing, manipulating, or using a real physical part may be displayed somewhere within the rendering (300).

Figure 4:
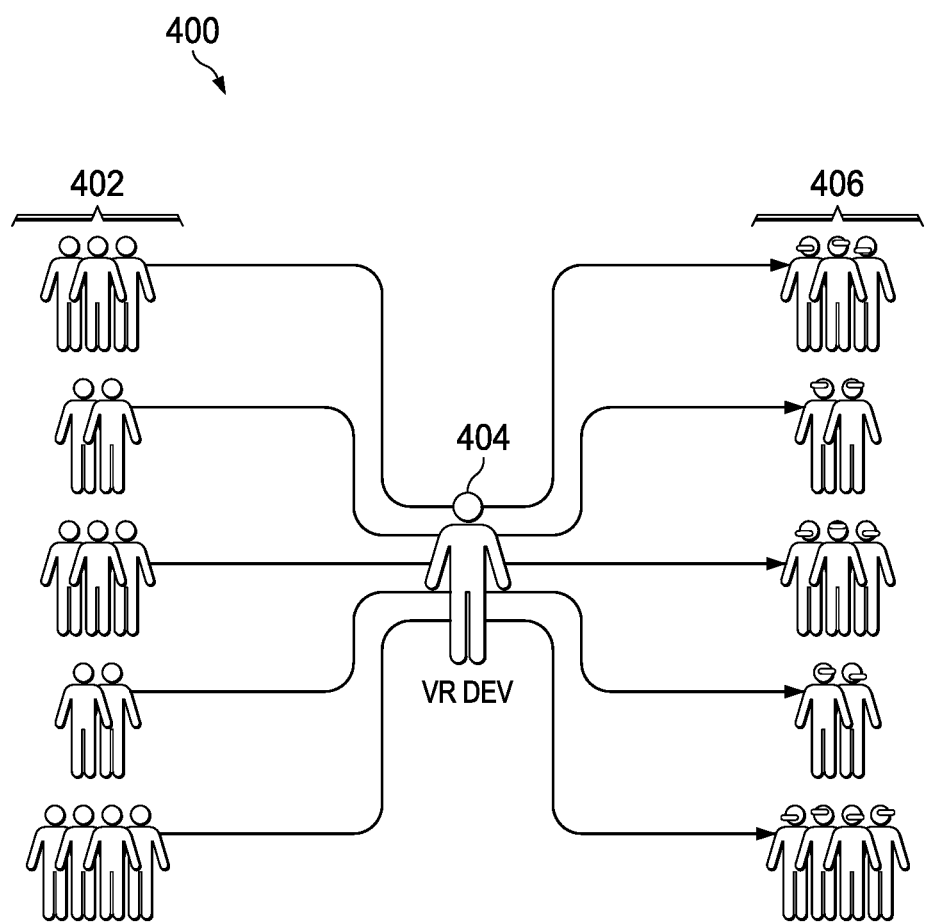
FIG. 4 shows a virtual reality creation environment, in accordance with one or more embodiments.

FIG. 4 shows a virtual reality creation environment, in accordance with one or more embodiments of the invention. The virtual reality creation environment (VR environment (400)) shown in FIG. 4 may be used to create the rendering (300) shown in FIG. 3.

A number of technicians (402) have one or more computer assisted drawing (CAD) files that describe a part or parts they wish to be able to render in a VR environment (400). Each of the technicians (402) represents one or more individuals on a team working in an organization directed to the manufacture or maintenance of physical objects, such as aircraft, and that plan on using the VR environment (400) in the process of manufacture or maintenance.

However, as indicated above, an expert programmer (404) is required to build one or more EGD files from the CAD files. Only one, or a few, expert programmers, such as expert programmer (404) are available. Thus, all of the teams of the technicians (402) provide their CAD files and requests to the expert programmer (404). Eventually, the expert programmer (404) will provide EGD files to the VR enabled users (406), who are the technicians (402) equipped with VR technology and the required EGD files.

However, a bottleneck in workflow occurs, because too few expert programmers are available to generate the EGD files from the CAD files. Thus, the overall manufacturing and/or maintenance operations of the organization are slowed. The bottleneck is undesirable due to possible cost overruns, delayed delivery, unsatisfied customers, etc.

Figure 5:
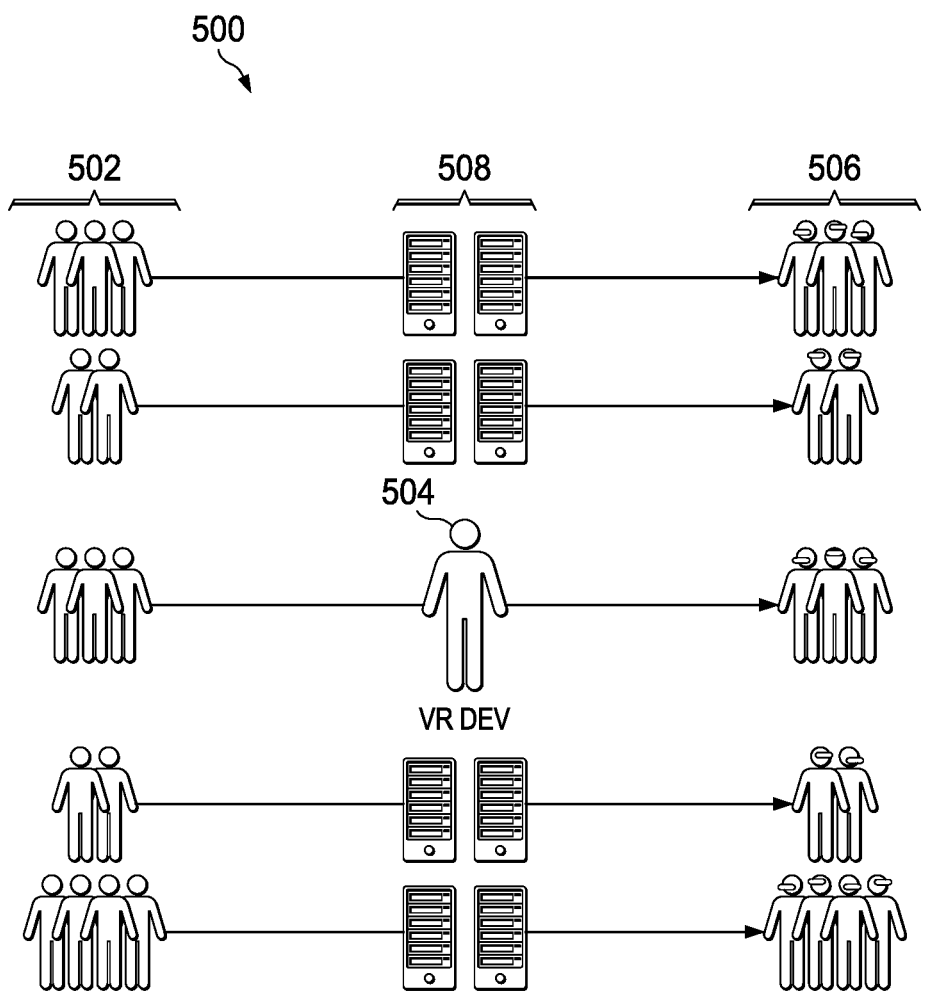
FIG. 5 shows an automatic virtual reality creation environment, in accordance with one or more embodiments.

FIG. 5 shows an automatic virtual reality creation environment (500), in accordance with one or more embodiments of the invention. Again, a number of technicians (502) have one or more computer assisted drawing (CAD) files that describe a part or parts they wish to be able to render in a VR environment so that they become VR enabled users (506).

The expert programmer (504) remains available to assist with custom or difficult VR builds. However, an automated system (508) is now available to automatically convert the various CAD files from the technicians (502) into the EGD files, or to otherwise build the EGD files from the CAD files. Thus, the workflow bottleneck described above is no longer an issue. The details of the exemplary automated system (508) are described below with respect to FIG. 6 through FIG. 11B. An alternate version of the automated system (508) is described with respect to FIG. 1.

Figure 6:
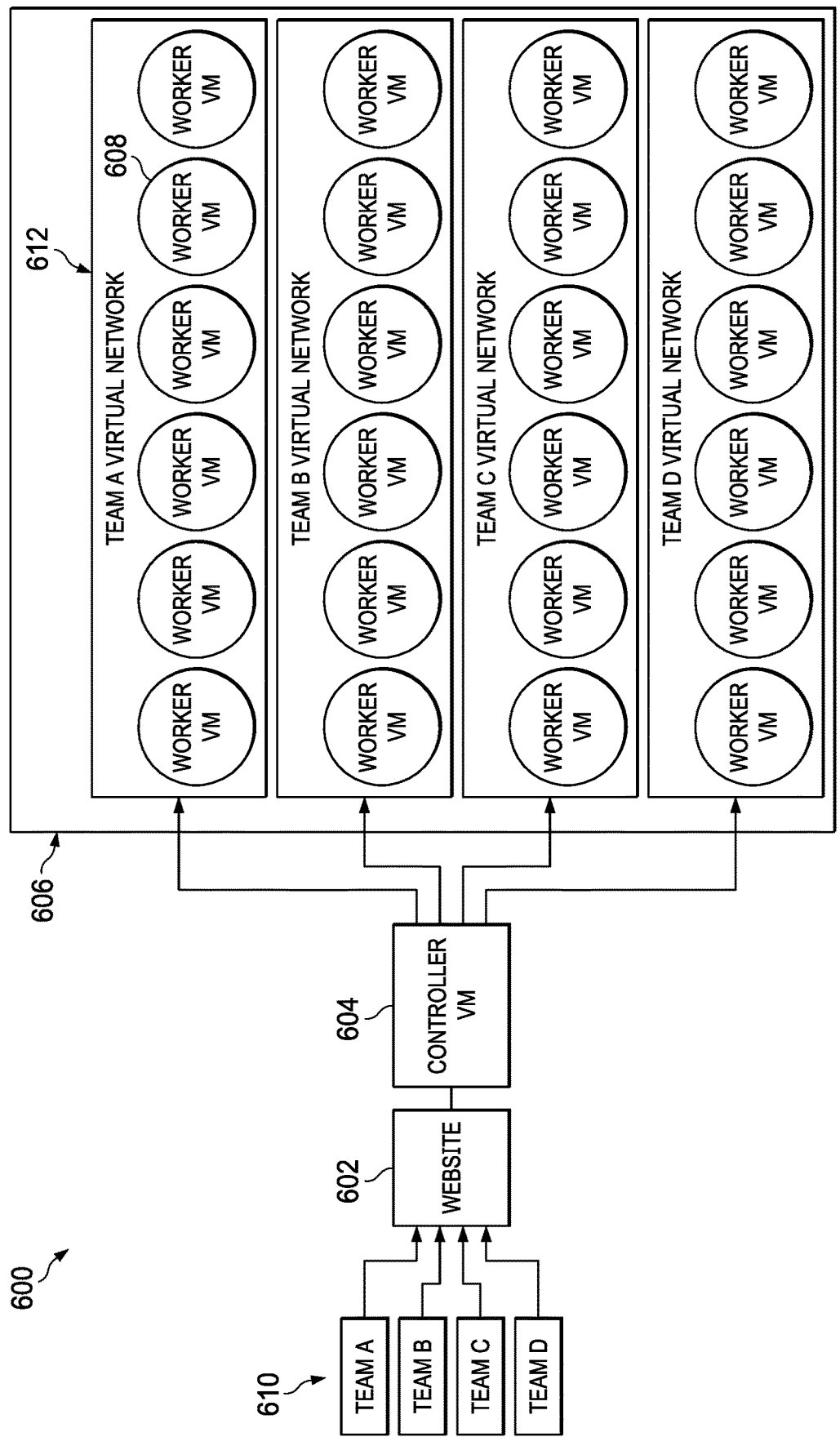
FIG. 6 shows a high level architecture for an automatic virtual reality creator, in accordance with one or more embodiments.

FIG. 6 shows a high level architecture for an automatic virtual reality (VR) creator, in accordance with one or more embodiments of the invention. The automated VR creator shown in FIG. 6 may be an expression of the system shown in FIG. 1, and a broad overview of the automated system (508) shown in FIG. 5.

In the architecture shown in FIG. 6, various teams (600) use local computers to access a website (602). The letters shown for the teams (600) only distinguish different teams of users, and have no other meaning in FIG. 6. The teams (600) are considered "client side." In other words, the local computers used by the teams (600) are considered client computers.

The website (602) prompts a user to upload a CAD file. The website (602) may also prompt the user to input desired control parameters, such as but not limited to a type of EGD file that is desired to be returned, special rendering templates or rules to be applied, etc. The website (602) is managed "server side." In other words, the website (602) is hosted on one or more servers, and may be managed by a third party who may or may not be affiliated with the owners of the servers.

In turn, the website (602) transmits provided information to a controller virtual machine (604) hosted on the one or more servers. Thus, the one or more embodiments may take CAD files useable in a variety of different platforms and convert the CAD files into EGD files, or otherwise build a EGD file from the CAD file, in a platform-independent manner.

The controller virtual machine (604) is configured to coordinate the many EGD file requests incoming from the teams (600). The controller virtual machine (604) may control other aspects of the coordination of EGD file creation, and the delivery of returned EGD files back to the teams (600). Additional details of the operation of the controller virtual machine (604) are described with respect to FIG. 7 and FIG. 8.

The system shown in FIG. 6 also includes many different worker VMs (606), including worker VM (608). An individual worker VM will perform the task of converting (or building) a specific CAD file into a specific EGD file for a specific request by one of the teams (600). Thus, for example, the worker VM (608) may convert or build a specific EGD file from a CAD file provided by team A (610). The controller virtual machine (604) may control which worker VM executes which project request.

In the system shown in FIG. 6, the worker VMs may be allocated by team. Thus, for example a set of worker VMs (612) may be assigned to provide for the requests made by the team A (610). However, this arrangement may be varied in other embodiments. For example, different sets of worker VMs may be allocated for the teams (600), or all worker VMs may be available to all of the teams (600).

Figure 7:
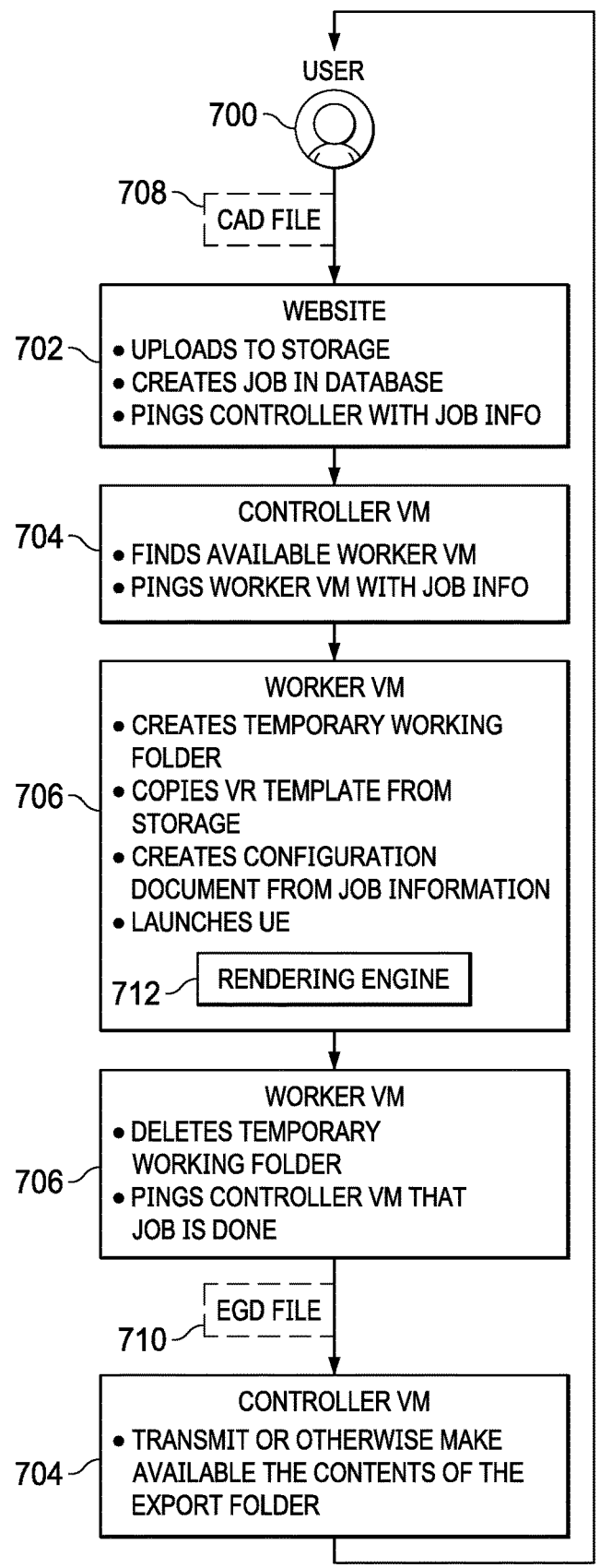
FIG. 7 shows an exemplary process for automatic creation of a virtual reality file, in accordance with one or more embodiments.

FIG. 7 shows an exemplary process for automatic creation of a virtual reality file, in accordance with one or more embodiments of the invention. Relative to FIG. 6, the user (700) may be one or more persons on one of the teams (600), the website (702) may be the website (602), the controller LCE (704) may be the controller virtual machine (604), and the worker VM (706) may be any one of the worker VMs (606) assigned to perform a given conversion or build task.

Initially, the user (700) accesses the website (702). The user (700) designates a local computer assisted design (CAD) file, namely CAD file (708), for upload into storage on the server. The user (700) may also fill in additional information as prompted by the user interface of the website (702), or upload additional information as optionally prompted by the website (702).

The website (702), as indicated above, is programmed to upload the CAD file (708) to storage on the server. The website (702) is programmed to create a job in a database for record keeping purposes. The website (702) is also programmed to ping, or otherwise provide, the controller VM (704) with any additional information provided by the user (700). Again, the term "VM" refers to "virtual machine," as described above.

In turn, the controller LCE (704) executes on the server. The controller LCE (704) acts as a coordinator and information distribution hub for the various worker VMs, including the worker VM (706) shown in FIG. 7. For example, the controller LCE (704) is configured to find an available worker VM, namely worker VM (706), from among many possible worker VMs that are either available or working on other projects. The worker VM (706) thereby becomes the in-use worker VM for the current job. The controller LCE (704) also pings, provides an address for access, or otherwise provides, the CAD file (708) and the other job-related information to the worker VM (706) that is the in-use worker VM.

The actual build of a EGD file (710) from the CAD file (708), or alternatively the transformation of the CAD file (708) to the EGD file (710), is performed by the worker VM (706). Again, the worker VM (706) in this example is the selected, or in-use, worker VM.

The worker VM (706) creates a temporary working folder on the server for use in performing the build or transformation job. Optionally, the worker VM (706) may copy a virtual reality (VR) template from storage on the server for use in building the EGD file. The worker VM (706) may then incorporate information from the CAD file (708) into the rendering template as part of building the EGD file (710).

The worker VM (706) may also create a configuration document from the job information provided by the user (700) via the website (702), as coordinated by the controller LCE (704). Once the configuration document is prepared and, if used, the rendering template is ready, the worker VM (706) calls and executes the rendering engine (712). The rendering engine (712) is software that is programmed, when executed, to render image information in a VR setting, as well as to specify how virtual objects may interact in the VR setting. The rendering engine (712) may be custom software, or may be off-the-shelf software that is configured to interface with the worker VM (706). The process of using the rendering engine (712) to generate the EGD file (710) is described in additional detail with respect to FIG. 8.

Once the EGD file (710) is generated, the worker VM (706) deletes the temporary working folder and the information contained therein. In this manner, storage space and processing resources on the server may be conserved. However, the EGD file (710) is retained at least until after the EGD file (710) has been returned. Specifically, the worker VM (706) pings or notifies the controller LCE (704) that the job is done, and may transfer the rendering engine (712) to the control of the controller LCE (704).

In turn, the controller LCE (704) prepares to transfer the EGD file (710) back to the user (700). The step of preparing to transfer may include one or more of 1) compressing (e.g. zipping) the contents of the EGD file (710) in an export folder, 2) preparing an electronic message (e.g., email), or 3) establishing a file transfer protocol (FTP) session. Other means for delivering the EGD file (710) may also be used. For example, a link may be emailed or displayed on a website. The user may click on the link in order to initiate download of the EGD file (710) to the user's local computer.

In any case, the controller LCE (704) transmits the EGD file (710) back to the user (700). The user (700) may then use the EGD file (710) as part of generating an augmented rendering session for whatever task the user has in mind, such as but not limited to manufacturing or performing maintenance on an aircraft.

Note that the EGD file (710) may take a variety of different forms. Details on the nature of the EGD file (710) are described with respect to FIG. 9 and FIG. 10.

Figure 8:
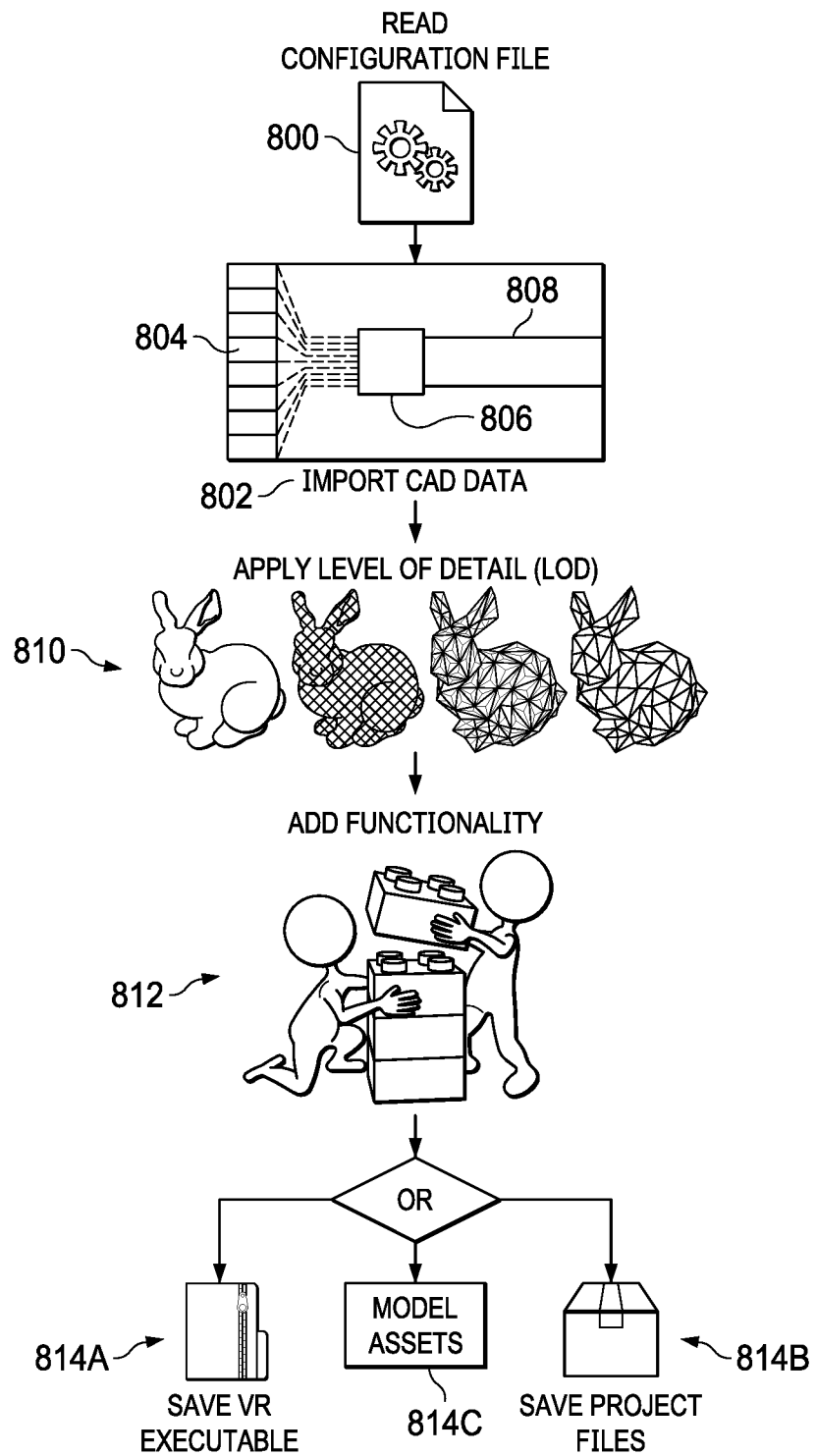
FIG. 8 shows a process for rendering engine scripting, in accordance with one or more embodiments.

FIG. 8 shows a process for rendering engine scripting, in accordance with one or more embodiments of the invention. Thus, FIG. 8 shows, relative to FIG. 7, details of how the rendering engine (712) performs the building of the EGD file (710) from the CAD file (708) or the transformation of the CAD file (708) into the EGD file (710). Stated differently, the process shown in FIG. 8 shows the details of the creation of the EGD file (710) by the rendering engine (712), as described with respect to FIG. 7. Thus, references in FIG. 8 to the "rendering engine" refer to the rendering engine (712) in FIG. 7 or the rendering engine (138) shown in FIG. 1, or described with respect to FIG. 2A FIG. 2A through FIG. 2F.

In the example of FIG. 8, the rendering engine reads the configuration file (800) prepared by the worker VM, such as worker VM (706) in FIG. 7. The configuration file (800) provides instructions and/or parameters regarding how the rendering engine will build or convert the CAD file into a EGD file.

The rendering engine then imports CAD data (802) from the CAD file. The CAD data (802) may take a variety of different formats and types of CAD data, as shown at CAD data types (804). The CAD data types (804) may include, but are not limited to, data produced by CAD programs such as 3ds Max, Cinema 4D, Revit and Setchup Pro, IFC, Rhino 3D, SolidWorks and CATIA, VRED and DELTAGEN, and others. Combinations of different types of CAD data may also be provided in some embodiments, such as when multiple CAD files prepared by different programs are provided as part of the CAD file (708).

Thereafter, data coordination software (806) may be used to facilitate the CAD data types (804) for use as input into the rendering engine (808). The data coordination software (806) is one or more software tools and/or plug-ins that either translate the CAD data types (804) into data types anticipated by the rendering engine (808), and/or scrub data from the CAD data types (804) that the rendering engine (808) cannot handle, and/or add data to the CAD data types (804) that the rendering engine (808) anticipates. An example of the data coordination software (806) may be DATASMITH®, which may be used to import data from a variety of different CAD data formats into the UNREAL® rendering engine. However, different forms of data coordination software (806) are contemplated, and the one or more embodiments are not necessarily limited to the use of any specific data transformation tools.

Once the data coordination software (806) has massaged or transformed the underlying CAD data in the CAD data types (804), the rendering engine (808) receives the CAD data as input. The rendering engine (808) then applies any rules specified in the configuration file (800) and applies the rules specified in the software that defines the data coordination software (806) to build the EGD file suitable for use with respect to augmented rendering software. For example, the rendering engine (808) may use a template which pre-defines rules or certain EGD file properties, apply the CAD data modified by the data coordination software (806) according to any rules specified in the configuration file (800), and then build the desired EGD file.

For example, the rendering engine (808) may apply a level of detail (LOD) (810) specified in the configuration file (800) from among several levels of detail available to the rendering engine (808). The data coordination software (806) may then add functionality (812) to the virtual objects specified in the EGD file. As an example of functionality, it may be specified that Part A may only be connected to Part B via a specific set of interfaces on each part. In a specific example, the functionality (812) may specify that only the distal end of a screw may be placed inside a receiving pilot hole. The functionality (812) may take many different forms such as, but not limited, to scaling of parts, substation of parts, functionality for requesting and/or displaying instructions for installing or performing maintenance on a part, etc.

The sum total of the detail, functionality, CAD information, and specific VR program instructions generated by the rendering engine (808) forms the EGD file, which in this example may be one or more of EGD file (814A), EGD file (814B), or EGD file (814C). In this example, EGD file (814A) is an executable file that acts as its own augmented rendering software that may be executed on a remote user computer to render a VR environment. EGD file (814B) is a dataset file which contains information for use in pre-existing augmented rendering software available on the remote user computer. EGD file (814C) is a file that contains model assets, as described further with respect to FIG. 9.

Figure 9:
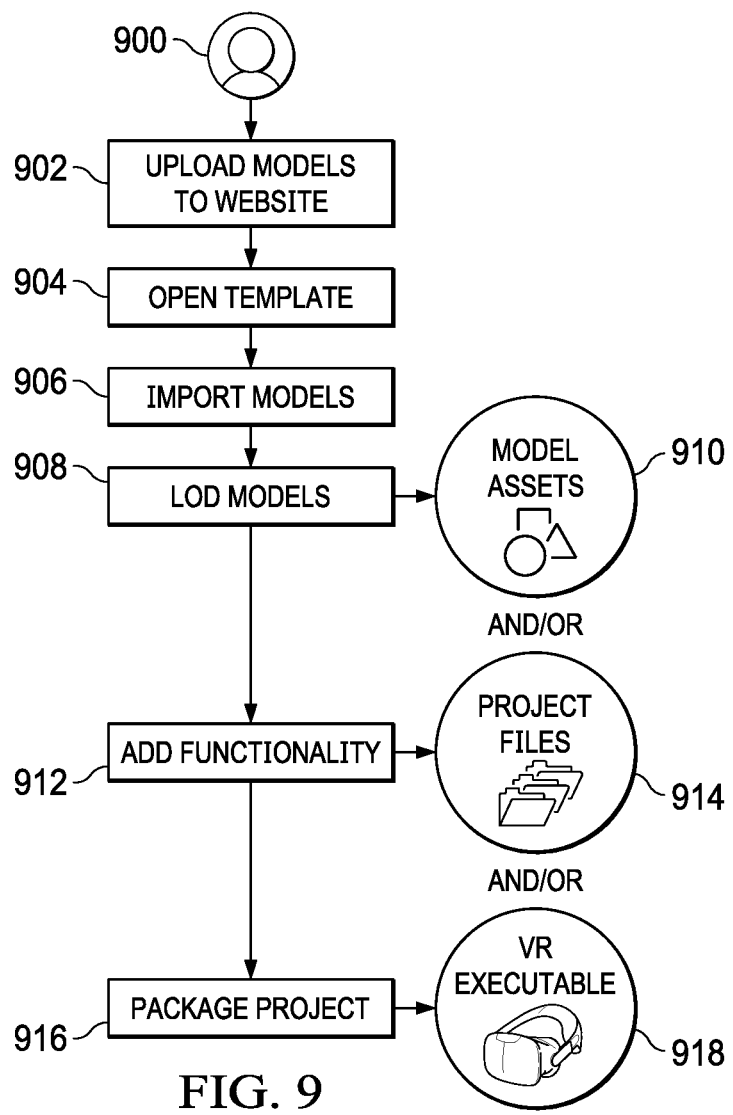
FIG. 9 shows an alternative process for automatic virtual reality file creation, with different file outputs, in accordance with one or more embodiments.

Additional detail regarding the types of output files that may be generated is described with respect to FIG. 9.

Figure 10:
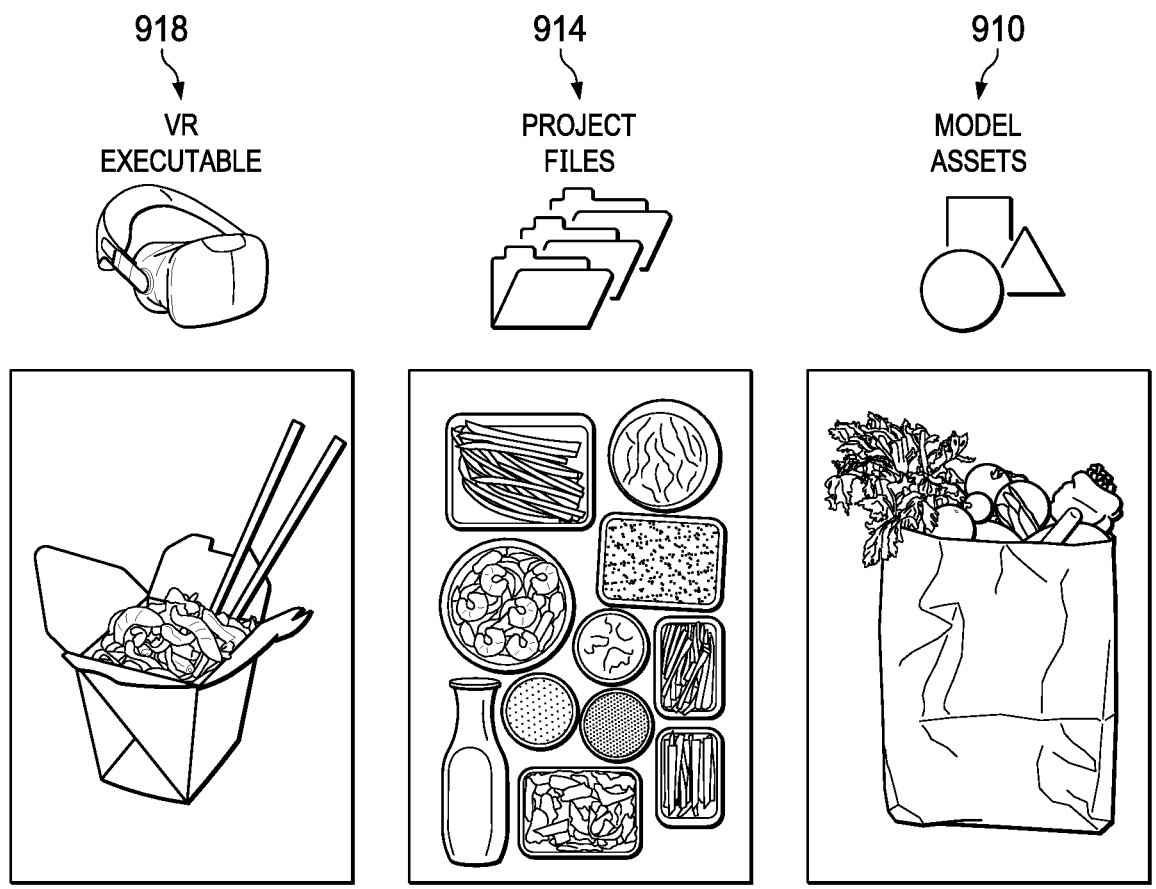
FIG. 10 shows an analogy for comparing the different file outputs shown in FIG. 9, in accordance with one or more embodiments.

FIG. 9 and FIG. 10 should be considered together. FIG. 9 shows an alternative process for automatic virtual reality file creation, with different file outputs, in accordance with one or more embodiments of the invention. FIG. 10 shows an analogy for comparing the different file outputs shown in FIG. 9, in accordance with one or more embodiments of the invention. In particular, FIG. 9 is an alternative process to the process shown in FIG. 7. FIG. 9 shows three different types of EGD files that might be generated as output of the rendering engine (808) of FIG. 8, FIG. 9, and FIG. 10 share common reference numerals.

In FIG. 9, as with the process shown in FIG. 7, a user (900) uploads at step (902) one or more CAD models via a website. In this example, the website may interact directly with a worker VM, though the website may also interact with a controller LCE as shown in FIG. 7. In any case, at step (904) the worker VM opens a template for use in constructing EGD files. At step (906), the worker VM imports the CAD files.

The worker VM then calls a rendering engine. The rendering engine, at step (908), then generates one or more model assets (910) that contain level of detail (LOD) files. Optionally, model assets (910) may be stored and transmitted back to the user. For example, the configuration file or specification provided by the user (900) to the website at step (902) may indicate that only the model assets (910) are desired. In this case, the model assets (910) are returned and the process terminates.

However, in another embodiment the process may continue. The rendering engine, at step (912) may add functionality to the EGD file so that functionality may be provided along with the model assets (910). In this manner, one or more dataset files (914) may be created. The dataset files contain both the model assets (910) and the functionality that indicates the interactions between rendered virtual objects. Again, the configuration file or the website may have been used to indicate that the dataset files (914) were what were desired. In this case, the dataset files (914) are returned and the process terminates.

However, in another embodiment, the process may continue. The rendering engine, at step (916) may add executable software files to the dataset files (914). The resulting output is one or more VR executable files (918), which are then returned, and the process terminates. The VR executable files (918) provide, taken together, a set of fully executable files that can be used, without more, to generate an augmented rendering session on a remote computer.

FIG. 10 shows, by analogy, the general differences between the model assets (910), the dataset files (914), and the VR executable files (918). The VR executable files (918) are comparable to fully prepared food, ready to eat. More accurately, the VR executable files (918) may be executed only a remote computer not otherwise programmed to execute an augmented rendering session. In this manner, a technician needs no special software in order to upload CAD files to the website, and receive the files necessary to establish an augmented rendering session for the desired project.

The dataset files (914) are comparable to the base components of food pre-prepared and separated, ready for assembly and cooking. More accurately, the dataset files (914) may be plugged into existing augmented rendering software on the remote computer and then used to execute an augmented rendering session. The dataset files (914) may be desirable to an advanced or skilled technician, as the dataset files (914) give the technician more control over how the augmented rendering software will use the dataset files (914) and thus more control over the augmented rendering session itself.

The model assets (910) are comparable to the raw ingredients of food. More accurately, the model assets (910) provide the base data files that augmented rendering software can use to render the original CAD data in an augmented rendering session on a remote computer. The model assets (910) may be desirable to an expert technician, or even the expert programmer, as the model assets (910) gives the technician or programmer complete control over exactly how the augmented rendering session will be constructed and executed, while still providing the underlying CAD data that is desired in a format that the augmented rendering software can use.

Note that the model assets (910) may be deemed useful to an expert programmer asked to produce custom VR executable file for the user (900). The expert programmer can save the time that would have been used in converting the CAD data for use by the augmented rendering software via the automated process described herein, but then use the model assets (910) to construct a custom project and VR executable file.

Figure 11A:
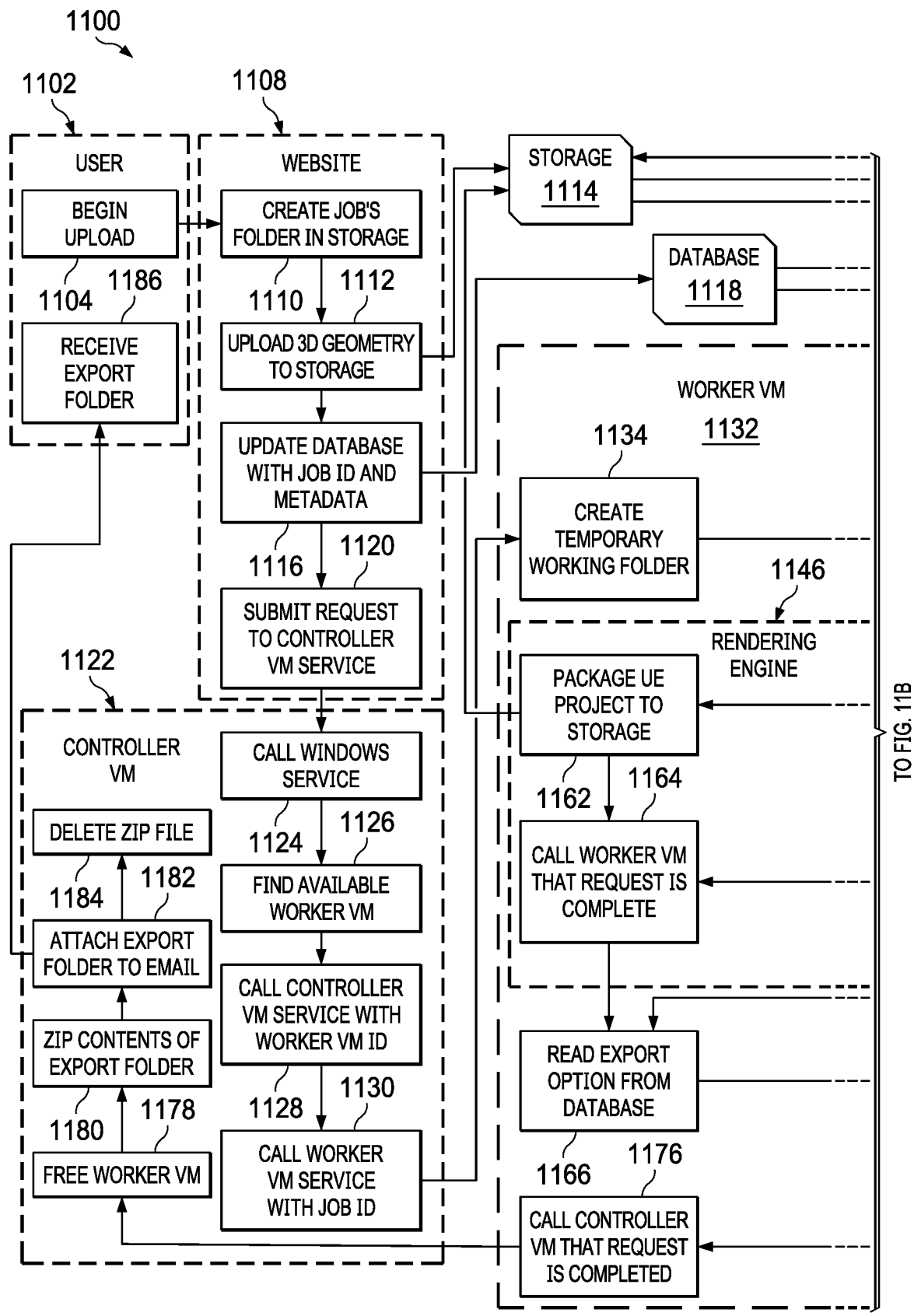
FIG. 11A and FIG. 11B show a detailed flow of an automatic virtual reality creator in use, in accordance with one or more embodiments.
Figure 11B:
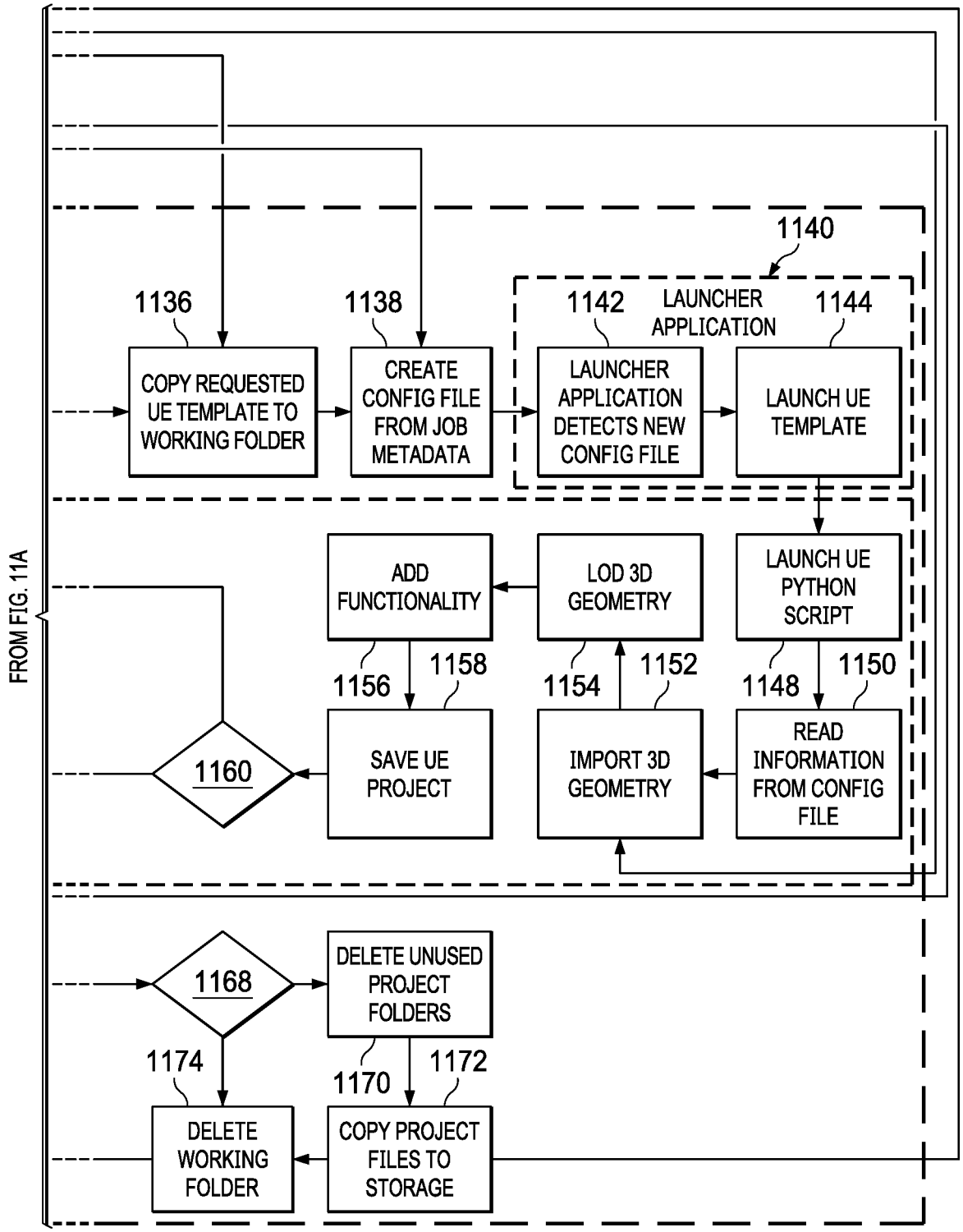

FIG. 11A and FIG. 11B show a detailed flow of an automatic virtual reality creator in use, in accordance with one or more embodiments of the invention. The example of FIG. 11A and FIG. 11B provides a more detailed example relative to the example shown in FIG. 7, or the methods shown in FIG. 2A through FIG. 2F.

In FIG. 11A and FIG. 11B, different areas are shown. Each of the areas reflects a logical entity involved in the EGD file creation process.

The first such area is the client side (1100), which includes a remote computer operated by the user (1102). The user uses the remote computer to begin an upload at step (1104) to a website (1108), which is the second area.

The website (1108) provides, at step (1110) a user interface which allows a user to create a job folder in a server-side storage (1114). Then, at step (1112), three-dimensional (3D) geometry from the CAD file(s) are uploaded to the storage (1114). Additionally, the website updates a server-side database (1118) with a job identifier (ID) and metadata. The metadata may indicate job configuration information, possibly also provided by the user (1102). The website (1108) then, at step (1120) submits a request to a controller virtual machine (controller LCE (1122)).

The controller LCE (1122) is a third area. In response to the submission of the request at step (1120), the controller LCE (1122) calls a WINDOWS® service at step (1124). The WINDOWS® service may be used to find an available worker virtual machine, such as the worker VM (132) described further below. The controller LCE (1122) can then, at step (1128) call a controller LCE service with a worker VM identifier (ID). Then, at step (1130), the controller LCE (1122) calls a worker VM service with a job identifier (ID).

The process then shifts to a fourth area, the worker VM (1132). In particular, at step (1134), the worker VM (1132) creates a temporary working folder. Then, at step (1136), the worker VM (1132) copies a requested rendering engine template from the server-side storage (1114) to the working folder. The worker VM (1132) then, at step (1138) creates a configuration file from job metadata that is stored in the server-side database (1118). The job metadata may have been received from the user (1102) via the website (1108), or may be pre-existing in the server-side database (1118).

Next, optionally, the worker VM (1132) may call a launcher application (1140). An application launcher is a computer program that helps a user to locate and start other computer programs. The launcher application (1140) is optional, but may be useful if starting a rendering engine that expects repetitive or commonly defined information to be provide to it prior to launch of the rendering application.

If the launcher application (1140) is used, then the launcher application (1140) detects a new configuration file, at step (1142). A rendering engine template may then be launched, at step (1144). Again, the template may have commonly used definitions that are appropriate for a certain class of EGD file creation requests.

In any case, regardless of whether a launcher application (1140) is used, the rendering engine (1146) is launched. The rendering engine (1146) is shown as a fifth area within FIG. 11A and FIG. 11B; however, the rendering engine (1146) is executed by the worker VM (1132) and thus is also part of the fourth area within FIG. 11A and FIG. 11B. Thus, when the rendering engine (1146) takes an action, what is occurring is that the software that constitutes the rendering engine (1146) performs some action when executed by the worker VM (1132).

In particular, the rendering engine (1146) launches a rendering engine script, at step (1148). The script may provide instructions for reading a configuration file, providing additional information to the rendering engine (1146), etc. In this case, the script may be used to read information from the configuration file, at step (1150).

At step (1152), the rendering engine (1146) imports the 3D geometry from the server-side storage (1114). The 3D geometry may be combined with the information read from the configuration file at step (1150).

The rendering engine (1146) then generates the level of detail (LOD) 3D geometry files, at step (1154). Creation of the LOD 3D geometry files is performed by polygon reduction techniques. These polygon reduction techniques utilize algorithms to reduce the complexity of a 3D model.

Then, at step (1156), the rendering engine (1146) adds VR functionality to the LOD geometry files to form the EGD file(s). Again, the functionality may be rules or data that indicate how the virtual objects defined in the LOD 3D geometry files may interact with each other.

The rendering engine (1146) then saves the dataset files, at step (1158). A decision at step (1160) is then made regarding what type of file is to be provided to the user. As shown in FIG. 9 and FIG. 10, the EGD files created by the rendering engine (1146) user may be LOD files, dataset files, or an executable file. Thus, the output of the decision at step (1160) is a EGD file of a specified type.

Optionally, at step (1162), the rendering engine (1146) may package the dataset file (i.e., the EGD file(s)) and store them in the server-side storage (1114). Otherwise, or in addition, at step (1164) the rendering engine (1146) calls the worker VM (1132) and indicates to the worker VM (1132) that the data set file generation request is complete.

Control of the process then passes back to the worker VM (1132). At step (1166), the worker VM (1132) reads, from the server-side database (1118), the export option chosen. A decision is then made at step (1168) whether it is necessary to delete unnecessary files from the EGD file(s) that have been output by the rendering engine (1146). For example, if a user selected an output of "dataset files", then any executable file information may be deemed to be "bloat" (i.e. undesirable data) that should be deleted. In another example, some project folders may be deemed unnecessary and thus constitute file bloat for a particular project. If it is determined at step (1168) that files are to be deleted, then at step (1170) the unused project folders and any other unnecessary information is deleted. Optionally, a copy of the dataset files may be saved to storage, at step (1172).

Then, at step (1174), or if called for at the decision at step (1168), the worker VM (1132) deletes the working folder. The worker VM (1132) then calls the controller LCE (1122) at step (1176) and notifies the controller LCE (1122) that the request to generate the EGD file(s) has been completed.

Control then passes back to the controller LCE (1122). The controller LCE (1122) then, at step (1178) sets a flag or other indicator to indicate that the worker VM (1132) is now free and available to perform a future VR build request.

The controller LCE (1122) then, optionally at step (1180), may compress (e.g., zip) the contents of the VR folder into an export folder. The controller LCE (1122) may then, at step (1182) attach the export folder to an email message. Alternatively, at step (1182) the controller LCE (1122) may generate a file transfer protocol (FTP) session in order to directly transmit the export. In either case, the export folder is transmitted and is received back at the client computer, at step (1186). Optionally, the export folder may be deleted from the controller LCE (1122) at step (1184) in order to reduce the resources used or needed by the controller LCE (1122). In one embodiment, the method of FIG. 11A and FIG. 11B may terminate thereafter.

Thus, in summary, the one or more embodiments provide for an automatic creator of real time rendering content. The automatic virtual reality creator is a tool for automatically creating VR content. Users can upload 3D geometry to a website and the automatic VR creator will create the augmented rendering session and email the completed VR application or dataset files back to the user. Thus, the one or more embodiments avoid the problem that, ordinarily, creating augmented rendering sessions requires time by VR developer who is skilled at creating augmented rendering session using a real-time rendering engine (aka a game engine). However, the one or more embodiments provide for a completely automated pipeline for creating augmented rendering sessions, thereby greatly reducing the time it takes to make an augmented rendering session, and eliminating the need for a VR developer for routine augmented rendering session creation from CAD files.

The one or more embodiments may be a cloud based system that takes a CAD model and environment as input, and generates a VR environment (dataset files or executable files) based on the inputs. In one example a website acts as the user interface to collect the inputs and generate the build command, but the website could be replaced by a service. A controller virtual machine (VM) receives the build command and assigns a task to one or more worker VMs. Each worker VM runs the rendering engine (which could be a game engine) and generates the project or executable. The resulting EGD file(s) go back to the controller LCE, which packages the EGD file(s) back to the user in the desired format. The one or more embodiments allow for adding functionality to the EGD files in order to provide additional elements like hand tools to the scene, or executable files useful for executing an augmented rendering session on a remote computer that does not otherwise have augmented rendering software. The controller LCE manages the operation of the worker VMs, which can be allocated on demand, thereby providing for an efficient and ongoing server-side, cloud-based service.

Figure 12A:
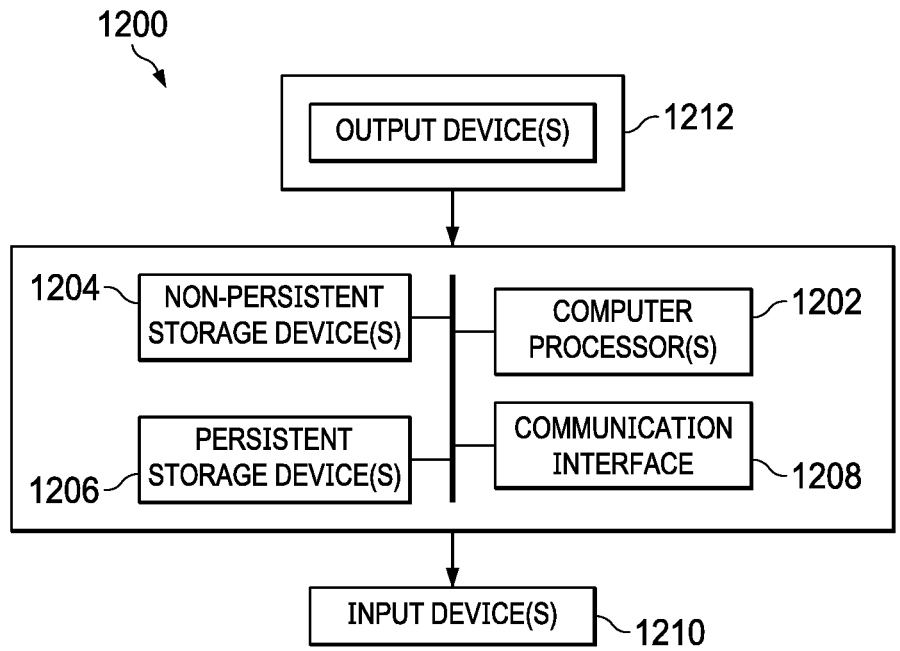
FIG. 12A is an example of a computing system in which an automatic virtual reality creation system may be implemented, in accordance with one or more embodiments.
Figure 12B:
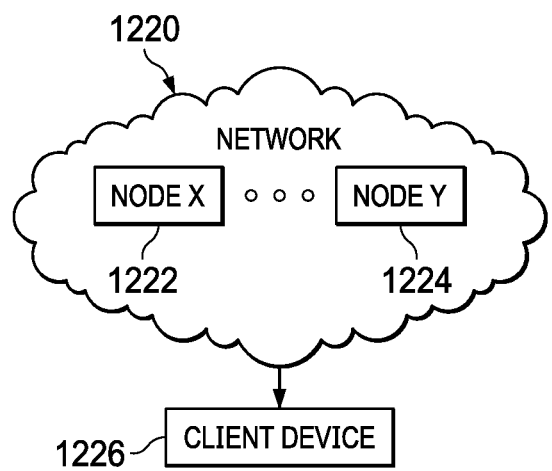
FIG. 12B is an example of a network in which an automatic virtual reality creation system may be implemented, in accordance with one or more embodiments.

FIG. 12A and FIG. 12B are examples of a computing system and a network, in accordance with one or more embodiments of the invention. Embodiments of the invention may be implemented on a computing system specifically designed to achieve an improved technological result. When implemented in a computing system, the features and elements of the disclosure provide a significant technological advancement over computing systems that do not implement the features and elements of the disclosure. Specifically, the one or more embodiments enable computer-based rendering functions that previously required a human expert programmer to perform, thereby resulting in significant reductions in labor costs and design iteration loops during manufacturing and maintenance of real physical objects Any combination of mobile, desktop, server, router, switch, embedded device, or other types of hardware may be improved by including the features and elements described in the disclosure. For example, as shown in FIG. 12A, the computing system (1200) may include one or more computer processor(s) (1202), non-persistent storage device(s) (1204) (e.g., volatile memory, such as random access memory (RAM), cache memory), persistent storage device(s) (1206) (e.g., a solid state drive, a hard disk, an optical drive such as a compact disk (CD) drive or digital versatile disk (DVD) drive, a flash memory, etc.), a communication interface (1208) (e.g., Bluetooth interface, infrared interface, network interface, optical interface, etc.), and numerous other elements and functionalities that implement the features and elements of the disclosure.

The computer processor(s) (1202) may be an integrated circuit for processing instructions. For example, the computer processor(s) (1202) may be one or more cores or micro-cores of a processor. The computing system (1200) may also include one or more input device(s) (1210), such as a touchscreen, a keyboard, a mouse, a microphone, a touchpad, an electronic pen, or any other type of input device.

The communication interface (1208) may include an integrated circuit for connecting the computing system (1200) to a network (not shown) (e.g., a local area network (LAN), a wide area network (WAN) such as the Internet, a mobile network, or any other type of network) and/or to another device, such as another computing device.

Further, the computing system (1200) may include one or more output device(s) (1212), such as a screen (e.g., a liquid crystal display (LCD), a plasma display, a touchscreen, a cathode ray tube (CRT) monitor, a projector, or other display device), a printer, an external storage, or any other output device. One or more of the output device(s) (1212) may be the same or different from the input device(s) (1210). The input and output device(s) (1210 and 1212) may be locally or remotely connected to the computer processor(s) (1202), the non-persistent storage device(s) (1204), and the persistent storage device(s) (1206). Many different types of computing systems exist, and the aforementioned input and output device(s) (1210 and 1212) may take other forms.

Software instructions in the form of computer readable program code to perform examples herein may be stored, in whole or in part, temporarily or permanently, on a non-transitory computer readable medium such as a CD, a DVD, a storage device, a diskette, a tape, flash memory, physical memory, or any other computer readable storage medium. Specifically, the software instructions may correspond to computer readable program code that, when executed by a processor(s), is configured to perform one or more examples herein.

The computing system (1200) in FIG. 12A may be connected to or be a part of a network. For example, as shown in FIG. 12B, the network (1220) may include multiple nodes (e.g., node X (1222), node Y (1224)). Each node may correspond to a computing system, such as the computing system (1200) shown in FIG. 12A, or a group of nodes combined may correspond to the computing system (1200) shown in FIG. 12A. By way of an example, embodiments herein may be implemented on a node of a distributed system that is connected to other nodes. By way of another example, some embodiments may be implemented on a distributed computing system having multiple nodes, where each portion may be located on a different node within the distributed computing system. Further, one or more elements of the aforementioned computing system (1200) may be located at a remote location and connected to the other elements over a network.

Although not shown in FIG. 12B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (1222), node Y (1224)) in the network (1220) may be configured to provide services for a client device (1226). For example, the nodes may be part of a cloud computing system. The nodes may include functionality to receive requests from the client device (1226) and transmit responses to the client device (1226). The client device (1226) may be a computing system, such as the computing system (1200) shown in FIG. 12A. Further, the client device (1226) may include and/or perform all or a portion of one or more embodiments.

The computing system (1200) or group of computing systems described in FIGS. 12A and 12B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready.

An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

Shared memory refers to the allocation of virtual memory space in order to substantiate a mechanism for which data may be communicated and/or accessed by multiple processes. In implementing shared memory, an initializing process first creates a shareable segment in persistent or non-persistent storage. Post creation, the initializing process then mounts the shareable segment, subsequently mapping the shareable segment into the address space associated with the initializing process. Following the mounting, the initializing process proceeds to identify and grant access permission to one or more authorized processes that may also write and read data to and from the shareable segment. Changes made to the data in the shareable segment by one process may immediately affect other processes, which are also linked to the shareable segment. Further, when one of the authorized processes accesses the shareable segment, the shareable segment maps to the address space of that authorized process. Often, only one authorized process may mount the shareable segment, other than the initializing process, at any given time.

Other techniques may be used to share data, such as the various data described in the present application, between processes without departing from the scope of the examples described herein. The processes may be part of the same or different application and may execute on the same or different computing system.

Rather than or in addition to sharing data between processes, the computing system performing one or more embodiments may include functionality to receive data from a user. For example, in one or more embodiments, a user may submit data via a graphical user interface (GUI) on the user device. Data may be submitted via the graphical user interface by a user selecting one or more graphical user interface widgets or inserting text and other data into graphical user interface widgets using a touchpad, a keyboard, a mouse, or any other input device. In response to selecting a particular item, information regarding the particular item may be obtained from persistent or non-persistent storage by the computer processor. Upon selection of the item by the user, the contents of the obtained data regarding the particular item may be displayed on the user device in response to the user's selection.

By way of another example, a request to obtain data regarding the particular item may be sent to a server operatively connected to the user device through a network. For example, the user may select a uniform resource locator (URL) link within a web client of the user device, thereby initiating a Hypertext Transfer Protocol (HTTP) or other protocol request being sent to the network host associated with the URL. In response to the request, the server may extract the data regarding the particular selected item and send the data to the device that initiated the request. Once the user device has received the data regarding the particular item, the contents of the received data regarding the particular item may be displayed on the user device in response to the user's selection. Further to the above example, the data received from the server after selecting the URL link may provide a web page in Hyper Text Markup Language (HTML) that may be rendered by the web client and displayed on the user device.

Once data is obtained, such as by using techniques described above or from storage, the computing system, in performing one or more embodiments, may extract one or more data items from the obtained data. For example, the extraction may be performed as follows by the computing system (1200) in FIG. 12A. First, the organizing pattern (e.g., grammar, schema, layout) of the data is determined, which may be based on one or more of the following: position (e.g., bit or column position, Nth token in a data stream, etc.), attribute (where the attribute is associated with one or more values), or a hierarchical/tree structure (consisting of layers of nodes at different levels of detail-such as in nested packet headers or nested document sections). Then, the raw, unprocessed stream of data symbols is parsed, in the context of the organizing pattern, into a stream (or layered structure) of tokens (where each token may have an associated token "type").

Next, extraction criteria are used to extract one or more data items from the token stream or structure, where the extraction criteria are processed according to the organizing pattern to extract one or more tokens (or nodes from a layered structure). For position-based data, the token(s) at the position(s) identified by the extraction criteria are extracted. For attribute/value-based data, the token(s) and/or node(s) associated with the attribute(s) satisfying the extraction criteria are extracted. For hierarchical/layered data, the token(s) associated with the node(s) matching the extraction criteria are extracted. The extraction criteria may be as simple as an identifier string or may be a query presented to a structured data repository (where the data repository may be organized according to a database schema or data format, such as eXtensible Markup Language (XML)).

The extracted data may be used for further processing by the computing system. For example, the computing system (1200) of FIG. 12A, while performing one or more embodiments, may perform data comparison. Data comparison may be used to compare two or more data values (e.g., A, B). For example, one or more embodiments may determine whether A>B, A=B, A !=B, A<B, etc. The comparison may be performed by submitting A, B, and an opcode specifying an operation related to the comparison into an arithmetic logic unit (ALU) (i.e., circuitry that performs arithmetic and/or bitwise logical operations on the two data values). The ALU outputs the numerical result of the operation and/or one or more status flags related to the numerical result. For example, the status flags may indicate whether the numerical result is a positive number, a negative number, zero, etc. By selecting the proper opcode and then reading the numerical results and/or status flags, the comparison may be executed. For example, in order to determine if A>B, B may be subtracted from A (i.e., A−B), and the status flags may be read to determine if the result is positive (i.e., if A>B, then A−B>0). In one or more embodiments, B may be considered a threshold, and A is deemed to satisfy the threshold if A=B or if A>B, as determined using the ALU. In one or more embodiments, A and B may be vectors, and comparing A with B requires comparing the first element of vector A with the first element of vector B, the second element of vector A with the second element of vector B, etc. In one or more embodiments, if A and B are strings, the binary values of the strings may be compared.

The computing system (1200) in FIG. 12A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, data containers (a database, a table, a record, a column, a view, etc.), identifiers, conditions (comparison operators), functions (e.g. join, full join, count, average, etc.), sorts (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The computing system (1200) of FIG. 12A may include functionality to present raw and/or processed data, such as results of comparisons and other processing. For example, presenting data may be accomplished through various presenting methods. Specifically, data may be presented through a user interface provided by a computing device. The user interface may include a GUI that displays information on a display device, such as a computer monitor or a touchscreen on a handheld computer device. The GUI may include various GUI widgets that organize what data is shown as well as how data is presented to a user. Furthermore, the GUI may present data directly to the user, e.g., data presented as actual data values through text, or rendered by the computing device into a visual representation of the data, such as through visualizing a data model.

For example, a GUI may first obtain a notification from a software application requesting that a particular data object be presented within the GUI. Next, the GUI may determine a data object type associated with the particular data object, e.g., by obtaining data from a data attribute within the data object that identifies the data object type. Then, the GUI may determine any rules designated for displaying that data object type, e.g., rules specified by a software framework for a data object class or according to any local parameters defined by the GUI for presenting that data object type. Finally, the GUI may obtain data values from the particular data object and render a visual representation of the data values within a display device according to the designated rules for that data object type.

Data may also be presented through various audio methods. In particular, data may be rendered into an audio format and presented as sound through one or more speakers operably connected to a computing device.

Data may also be presented to a user through haptic methods. For example, haptic methods may include vibrations or other physical signals generated by the computing system. For example, data may be presented to a user using a vibration generated by a handheld computer device with a predefined duration and intensity of the vibration to communicate the data.

The above description of functions presents only a few examples of functions performed by the computing system (1200) of FIG. 12A and the nodes (e.g., node X (1222), node Y (1224)) and/or client device (1226) in FIG. 12B. Other functions may be performed using one or more embodiments.

While the examples have been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A system comprising:
a controller logical computing element (controller LCE) on a server, wherein the controller LCE is configured to:
receive a first electronic file comprising geometry data in a first data structure,
identify an available worker LCE as an in-use worker LCE from among a plurality of worker LCEs, and
return a dataset file to a remote computer in a second data structure different than the first data structure;
the plurality of worker LCEs on the server, including the in-use worker LCE, wherein the in-use worker LCE is configured to:
import the geometry data from a storage,
create a configuration document,
launch a rendering engine to generate the dataset file, and
return the dataset file to the storage; and
the rendering engine, wherein the rendering engine is executable on the server, and wherein the rendering engine is configured to process, for a job instance using the geometry data, the dataset file in the second data structure.

2. The system of claim 1, wherein the controller LCE is further configured to, prior to returning the dataset file:
compress the dataset file to generate a single compressed dataset file,
generate an electronic message addressed to the remote computer, and
attach the single compressed dataset file to the electronic message.

3. The system of claim 1, wherein:
the controller LCE is further configured to receive, together with the first electronic file, job configuration information; and
the in-use worker LCE is further configured to create the job instance by:
creating, by the in-use worker LCE, a temporary working folder on the server for storing the dataset file;
creating, by the in-use worker LCE, the configuration document from the job configuration information; and
adjusting generation of the dataset file according to the configuration document.

4. The system of claim 3, wherein the in-use worker LCE is further configured to:
prior to launching the rendering engine, copy a rendering template from a data repository in communication with the server; and
automatically and parametrically reduce a rendering complexity of the geometry data.

5. The system of claim 1, wherein the in-use worker LCE is further configured to, after the in-use worker LCE returns the dataset file:
delete, by the in-use worker LCE, the dataset file, and the configuration document; and set, by the controller LCE, the in-use worker LCE as an available worker LCE.

6. The system of claim 1, wherein the in-use worker LCE is further configured to return the dataset file by returning a virtual reality (VR) executable file configured to generate an VR environment on the remote computer.

7. The system of claim 1, wherein the in-use worker LCE is further configured to return the dataset file by returning a plurality of dataset files configured for use by an augmented reality (AR) software program.

8. The system of claim 1, wherein the in-use worker LCE is further configured to return the dataset file by returning a plurality of model asset files configured for use by a polygon rendering program.

9. The system of claim 1, wherein the controller LCE is configured to receive the geometry data from a web browser of the remote computer.

10. The system of claim 1, wherein the geometry data comprises one or more of a computer automated design file, a real-time rendering project file, a polygonal geometry file, or an object definition file.

11. A method comprising:
executing a controller logical computing element (LCE) on a server;
executing a plurality of worker LCEs on the server;
receiving, at the controller LCE, a first electronic file comprising geometry data in a first data structure;
identifying, by the controller LCE, an available worker LCE as an in-use worker LCE from among the plurality of worker LCEs;
importing, by the in-use worker LCE, the geometry data;
establishing, by the in-use worker LCE, a job instance;
launching, by the in-use worker LCE, a rendering engine;
generating, by the rendering engine for the job instance and using the geometry data, a dataset file in a second data structure different than the first data structure;
returning, by the in-use worker LCE, the dataset file to the controller LCE; and
returning, by the controller LCE, the dataset file to a remote computer.

12. The method of claim 11, further comprising, prior to the controller LCE returning the dataset file:
compressing the dataset file to generate a compressed dataset file;
generating an electronic message addressed to the remote computer; and
attaching the compressed dataset file to the electronic message.

13. The method of claim 11, further comprising:
receiving, together with the first electronic file, job configuration information;
wherein establishing the job instance comprises:
creating, by the in-use worker LCE, a temporary working folder on the server for processing the first electronic file within the dataset file of the rendering engine;
creating, by the in-use worker LCE, a configuration document from the job configuration information; and
adjusting generation of the dataset file according to the configuration document.

14. The method of claim 13, further comprising:
prior to calling the rendering engine, copying a rendering template from a data repository in communication with the server; and
automatically and parametrically reducing a rendering complexity of the geometry data.

15. The method of claim 14, further comprising, after the in-use worker LCE returns the dataset file:
deleting, by the in-use worker LCE, the dataset file, the geometry data, and the configuration document; and
setting, by the controller LCE, the in-use worker LCE as an available worker LCE.

16. The method of claim 11, wherein returning the dataset file comprises returning a virtual reality (VR) executable file configured to generate an VR environment on the remote computer.

17. The method of claim 11, wherein returning the dataset file comprises returning a plurality of dataset files configured for use by a system selected from the group consisting of: virtual reality software and hardware, augmented reality software, and desktop computing software.

18. The method of claim 11, wherein returning the dataset file comprises returning a plurality of model asset files configured for use by a polygon rendering program.

19. The method of claim 11, wherein the geometry data is received from a web browser of the remote computer.

20. The method of claim 11, wherein the geometry data comprises one or more of a computer automated design file, a real-time rendering project file, a polygonal geometry file, or an object definition file.

* * * * *